(12) United States Patent
Hasegawa et al.

(10) Patent No.: US 10,935,725 B2
(45) Date of Patent: Mar. 2, 2021

(54) FUSION SPLICING DEVICE AND OPTICAL FIBER REINFORCING METHOD

(71) Applicant: FUJIKURA LTD., Tokyo (JP)

(72) Inventors: Ryo Hasegawa, Chiba (JP); Yoshiharu Kanda, Chiba (JP)

(73) Assignee: FUJIKURA LTD., Tokyo (JP)

( * ) Notice: Subject to any disclaimer, the term of this patent is extended or adjusted under 35 U.S.C. 154(b) by 273 days.

(21) Appl. No.: 16/088,742

(22) PCT Filed: May 28, 2018

(86) PCT No.: PCT/JP2018/020316
§ 371 (c)(1),
(2) Date: Sep. 26, 2018

(87) PCT Pub. No.: WO2019/225021
PCT Pub. Date: Nov. 28, 2019

(65) Prior Publication Data
US 2020/0310033 A1      Oct. 1, 2020

(30) Foreign Application Priority Data

May 21, 2018   (JP) .............................. JP2018-096785

(51) Int. Cl.
*G02B 6/255*      (2006.01)

(52) U.S. Cl.
CPC ......... *G02B 6/2553* (2013.01); *G02B 6/2551* (2013.01); *G02B 6/2555* (2013.01); *G02B 6/2558* (2013.01); *G02B 6/2552* (2013.01)

(58) Field of Classification Search
CPC .. G02B 6/2551; G02B 6/2553; G02B 6/2555; G02B 6/2558
See application file for complete search history.

(56) References Cited

U.S. PATENT DOCUMENTS 5,170,456 A * 12/1992 Itoh ...................... G02B 6/2551
                                                              385/59
6,485,199 B1 * 11/2002 Ware ...................... G02B 6/255
                                                              385/95

(Continued)

FOREIGN PATENT DOCUMENTS

CN         1542475 A      11/2004
CN       103140784 A       6/2013

(Continued)

OTHER PUBLICATIONS

Extended European Search Report in counterpart European Application No. 18764985.0 dated Apr. 9, 2019 (10 pages).

*Primary Examiner* — Daniel Petkovsek
(74) *Attorney, Agent, or Firm* — Osha Bergman Watanabe & Burton LLP

(57) ABSTRACT

A fusion splicing device is disclosed that includes a connector that fusion splices a pair of optical fibers and a glass clamp that clamps a glass part that has been removed of a coating of the optical fiber, where the glass clamp is provided at an outer side of the connector. The fusion splicing device further includes a coating clamp that clamps at least a part of the coating of the optical fiber and is provided at an outer side of the glass clamp. The fusion splicing device also includes a wind protector cover that covers the connector, the glass clamp, and the coating clamp. Additionally, the fusion splicing device includes a heater that heats a protection sleeve covered on a fusion splice point of the optical fibers that have been fusion spliced with the connector and an aligner that aligns fingertips holding the optical fiber.

9 Claims, 14 Drawing Sheets

(56) References Cited

U.S. PATENT DOCUMENTS

| | | | |
|---|---|---|---|
| 7,090,406 B2 | 8/2006 | Melton et al. | |
| 7,128,478 B2 * | 10/2006 | Takahashi | G02B 6/2551 |
| | | | 385/99 |
| 7,410,308 B2 * | 8/2008 | Qian | G02B 6/255 |
| | | | 385/95 |
| 9,964,705 B2 * | 5/2018 | Miyamori | G02B 6/2551 |
| 2004/0218878 A1 | 11/2004 | Takahashi et al. | |
| 2004/0247261 A1 | 12/2004 | Sato | |
| 2005/0123253 A1 | 6/2005 | Sato | |
| 2008/0044137 A1 | 2/2008 | Luther et al. | |
| 2015/0049991 A1 * | 2/2015 | Kawanishi | G02B 6/2551 |
| | | | 385/96 |
| 2018/0045894 A1 | 2/2018 | Takahashi et al. | |

FOREIGN PATENT DOCUMENTS

| | | |
|---|---|---|
| CN | 103364877 A | 10/2013 |
| CN | 208766330 U | 4/2019 |
| EP | 0 096 550 A1 | 12/1983 |
| EP | 3 159 720 A1 | 4/2017 |
| JP | H09-230160 A | 9/1997 |
| JP | 2008-52236 A | 3/2008 |
| JP | 4141891 B2 | 8/2008 |
| JP | 2011-048404 A | 3/2011 |
| JP | 2016-164598 A | 9/2016 |

\* cited by examiner

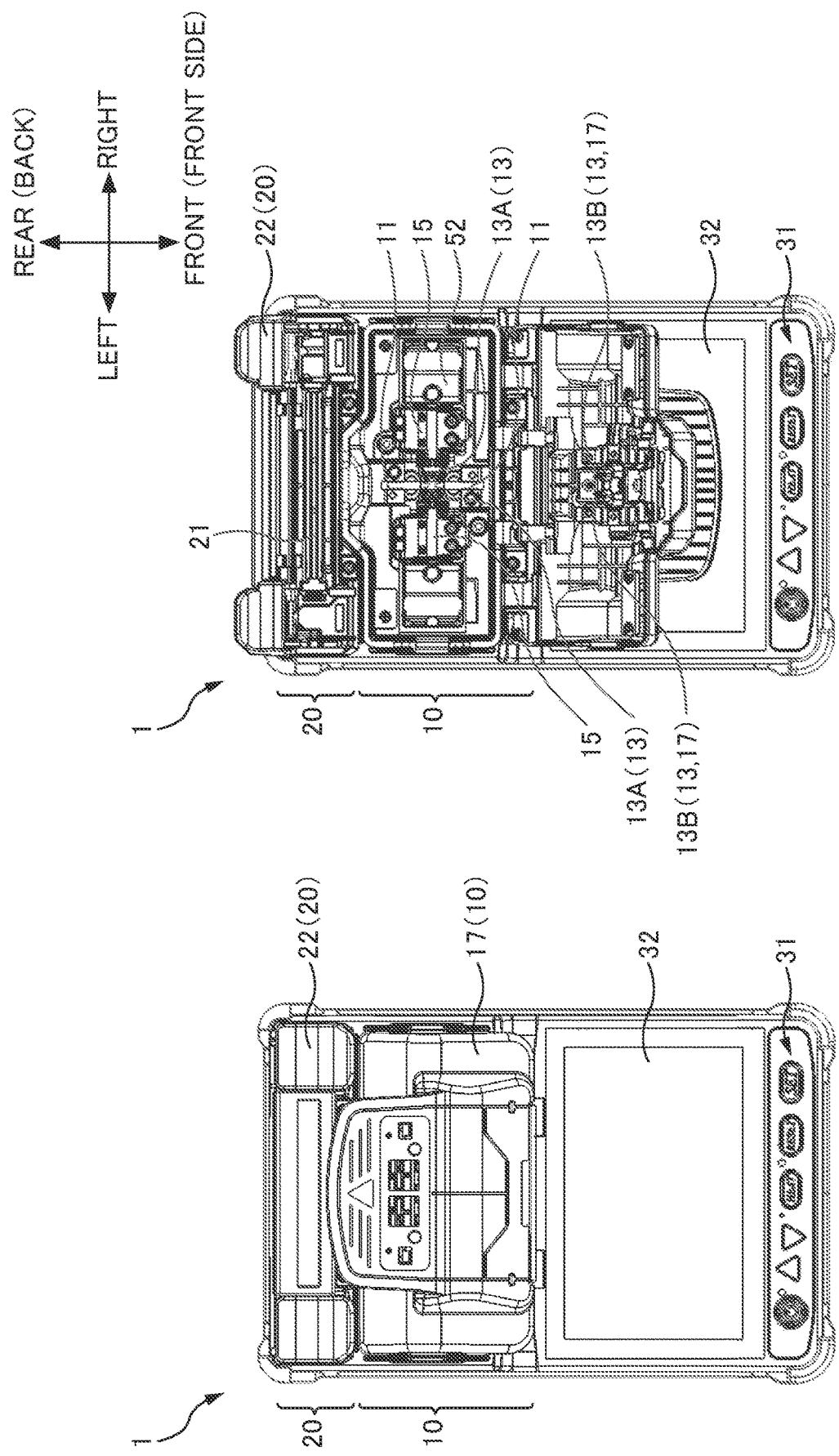

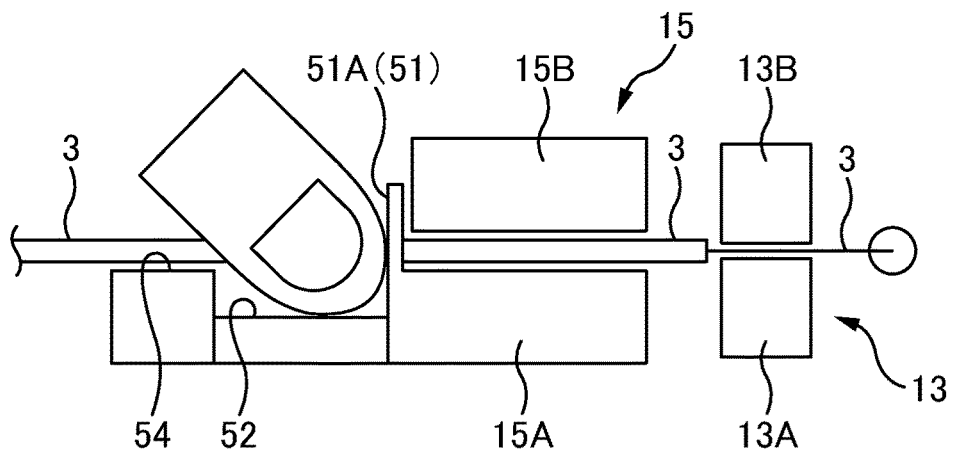
FIG. 7A (FIRST EMBODIMENT)
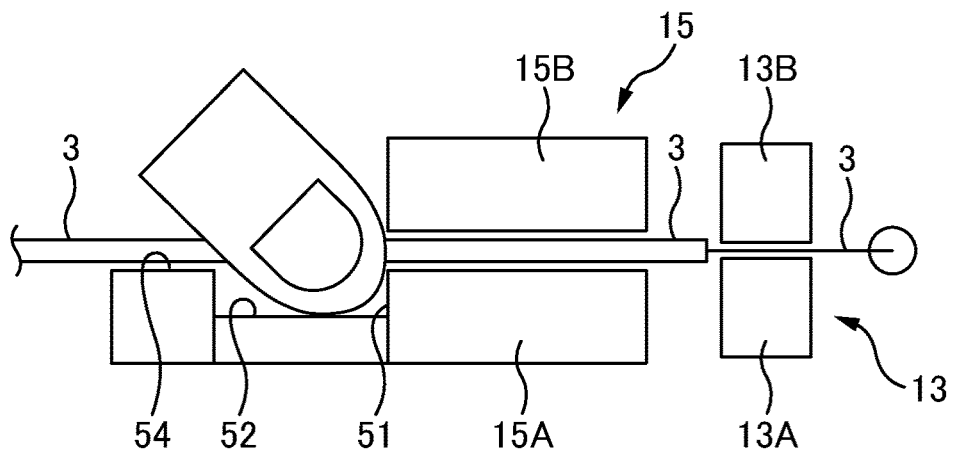
FIG. 7B (FIRST MODIFIED EXAMPLE)
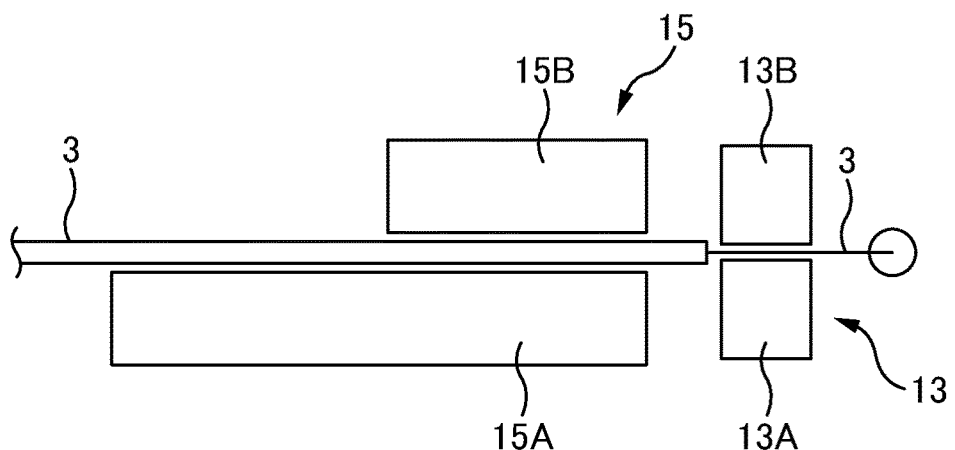
FIG. 7C (REFERENCE EXAMPLE)

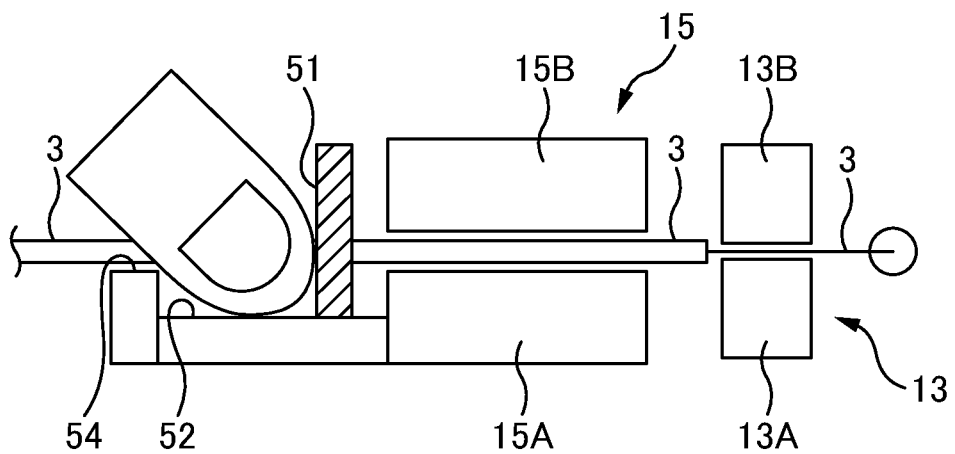
FIG. 8A (SECOND MODIFIED EXAMPLE)
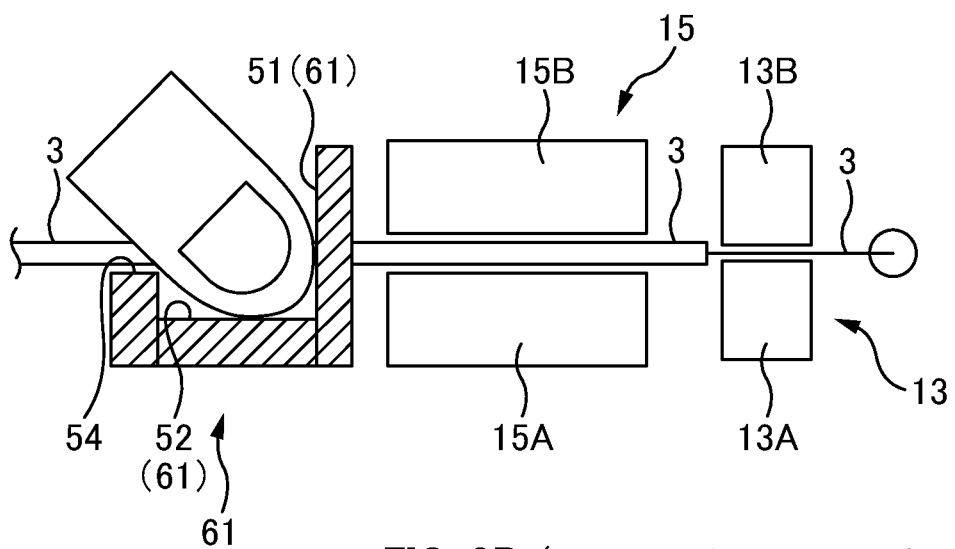
FIG. 8B (THIRD MODIFIED EXAMPLE)

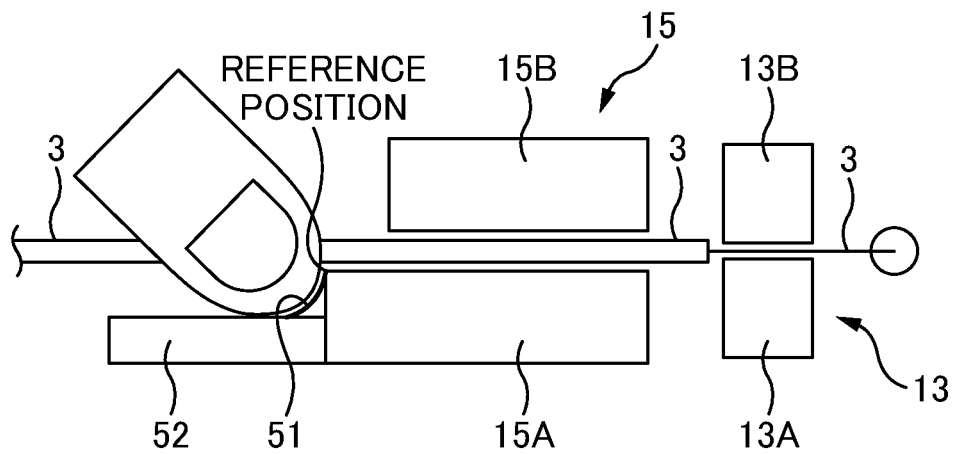
FIG. 9A (FOURTH MODIFIED EXAMPLE)
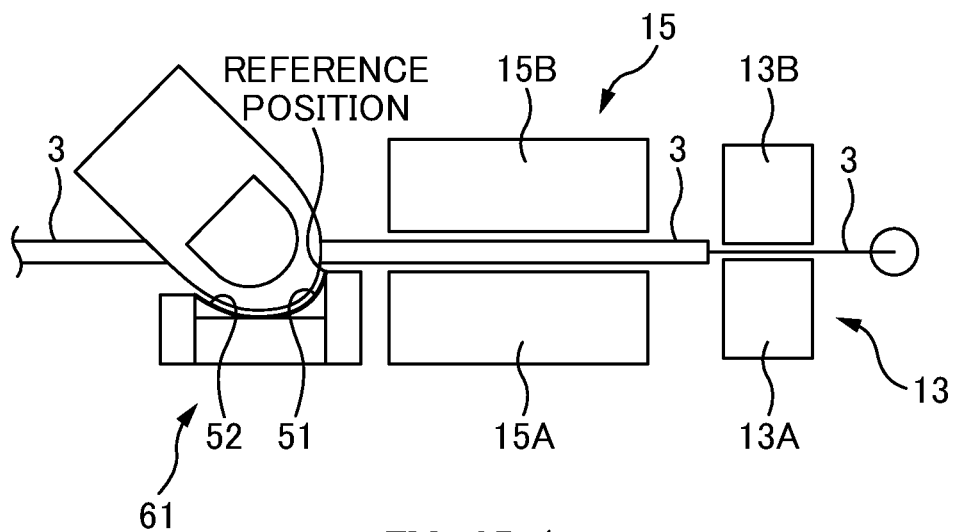
FIG. 9B (FIFTH MODIFIED EXAMPLE)

FUSION SPLICING DEVICE AND OPTICAL FIBER REINFORCING METHOD

TECHNICAL FIELD

The present invention generally relates to a fusion splicing device and an optical fiber reinforcing method.

BACKGROUND

Patent Literature 1 discloses a fusion splicer that fusions and connects optical fibers. Patent Literature 1 discloses covering a protection sleeve (heat-shrinkable tube) on a fusion splice point, heating the protection sleeve with a heater (heating part) of the fusion splicer, and reinforcing the fusion splice point.

CITATION LIST

Patent Literature

Patent Literature 1: Japanese Patent No. 4141891

SUMMARY

When heating a protection sleeve with a heater, it is necessary to (1) align a fusion splice point and a center of the protection sleeve, and (2) align the center of the protection sleeve and a center of the heater. These points will be described below.

FIG. 12A is an explanatory view of a positional relation between a fusion splice point and a protection sleeve 5. As shown in the diagram, an operator needs to align a fusion splice point and a center of the protection sleeve 5 when covering the protection sleeve 5 on the fusion splice point. In this way, when coatings of a pair of optical fibers 3 are removed such that a lead-out length L1 is shorter than a half of a length L2 of the protection sleeve 5, ends of the protection sleeve 5 and the coating of the optical fiber 3 can be overlapped. Supposing that the fusion splice point and the center of the protection sleeve 5 are misaligned, there is a possibility that the protection sleeve 5 and the coating of the optical fiber 3 cannot be overlapped, a portion that has been removed of the coating is exposed outside the protection sleeve 5, and strength of the optical fiber 3 cannot be maintained.

FIG. 12B is an explanatory view of a positional relation between a center of the protection sleeve 5 and a center of a heater 21. The heater 21 is formed such that the temperature at a center of the heater 21 (a section that is made to have a high temperature to heat the protection sleeve 5) in the longitudinal direction (left-right direction) is the highest, and the temperature gradient is such that the temperature gradually lowers from the center to end portions. The heater is configured as above to discharge air inside the protection sleeve 5 outside when being heated and shrinks, and to suppress bubbles from forming inside the protection sleeve 5. Suppose that a positional relation of the center of the protection sleeve 5 and the center of the heater 21 are misaligned, there is a possibility that a section that has not shrunk remains in one side of the protection sleeve 5.

Patent Literature 1 discloses that an operator tilts an optical fiber 3 that has been fusion spliced, makes the protection sleeve 5 that has been passed through with the optical fiber 3 slide with its own weight, and align the position of the protection sleeve 5 with respect to the fusion splice point, as shown in FIG. 13A-FIG. 13C. But with such an aligning method based on such visual checking, there is a possibility that the fusion splice point and the center of the protection sleeve 5 will become misaligned. Patent Literature 1 adopts the following alignment method.

FIG. 14 is an explanatory view of a configuration of a fusion splicing device disclosed in Patent Literature 1. This fusion splicing device is designed such that a total length 2B of a heating device 20' and a total length 2A of a fusion splicing part 10 are equal. This fusion splicing device is designed such that a distance A between a fusion splice point and a guide 91 to the fusion splicing part 10 side is equal to a distance B between the center of the heater 21 and a guide 93 to the heating device 20' side. A protection sleeve mount is provided with a guide part 92 to which an end face of the protection sleeve 5 is contacted. The position of the guide part 92 is adjusted such that a distance (L/2) between the center of the heater 21 and the end face of the guide part 92 becomes less than a half of a length L of the protection sleeve 5. After an operator has fusion spliced a pair of optical fibers 3, as shown in the diagram, the operator holds the optical fiber 3 with two fingers while contacting the guide 91 with the fingers, and takes out the optical fiber 3 from the fusion splicing part 10.

FIG. 15A to FIG. 15C are explanatory views of an alignment method using a fusion splicer of FIG. 14. When the operator has taken out the optical fiber 3 from the fusion splicing part 10, the operator makes an end face of the protection sleeve 5 contact the guide part 92 of the protection sleeve mount, as shown in FIG. 15A. Then, the operator makes the optical fiber 3 slide with respect to the protection sleeve 5 until the fingers holding the optical fiber 3 contact the guide 93 to the heating device 20' side, as shown in FIG. 15B. In this way, the fusion splice point and the center of the protection sleeve 5 are aligned. Next, the operator sets the protection sleeve 5 in the heater 21 while the fingers holding the optical fiber 3 are contacted to the guide 93 to the heating device 20' side, as shown in FIG. 15C. In this way, the center of the protection sleeve 5 and the center of the heater 21 are aligned.

With the alignment method shown in FIG. 15A to FIG. 15C, however, the protection sleeve 5 is to be aligned at a third place (here protection sleeve mount) that is different from the fusion splicing part 10 and the heating device 20'. Thus, in this alignment method, the operator has to temporarily move the fusion spliced optical fiber 3 from the fusion splicing part 10 to the third place (protection sleeve mount), align the fusion splice point and the protection sleeve 5 in the third place, and then further move the optical fiber 3 and the protection sleeve 5 from the third place to the heating device 20', and an operation after fusion splicing is not efficient.

One or more embodiments of the present invention carry out an aligning operation of a protection sleeve efficiently.

One or more embodiments of the invention relate to an optical fiber reinforcing method including:

placing a protection sleeve in advance onto a first optical fiber before fusion splicing;

clamping at least a part of a coating of the first optical fiber with a first coating clamp part, clamping a glass part that has been removed of a coating of the first optical fiber with a first glass clamp part, and clamping at least a part of a coating of a second optical fiber with a second coating clamp part, and clamping a glass part removed of a coating of the second optical fiber with a second glass clamp part;

fusion splicing the first optical fiber and the second optical fiber that are being clamped;

after the fusion splicing, removing the first optical fiber and the second optical fiber that have been clamped, while holding the second optical fiber with fingertips aligned to a position in which a distance to a fusion splice point is a half of the protection sleeve, the position being to an upper surface of a device inside a wind protector cover; and covering the protection sleeve onto the fusion splice point by sliding the protection sleeve placed onto the first optical fiber to contact the fingertips holding the second optical fiber.

Other features of the present invention will be made clear by the following description with reference to the drawings.

According to one or more embodiments of the present invention, an alignment operation of a protection sleeve can be efficiently carried out.

BRIEF DESCRIPTION OF DRAWINGS

FIG. 2A and FIG. 2B are top views of a fusion splicing device 1 in accordance with one or more embodiments.

FIG. 7A is a schematic explanatory view of a periphery of an aligning part 51 in accordance with one or more embodiments seen from the front.

FIG. 7B is an explanatory view of a first modified example in accordance with one or more embodiments.

FIG. 7C is a schematic explanatory view of a reference example without an aligning part 51 in accordance with one or more embodiments.

FIG. 8A is an explanatory view of a second modified example in accordance with one or more embodiments.

FIG. 8B is an explanatory view of a third modified example in accordance with one or more embodiments.

FIG. 9A is an explanatory view of a fourth modified example in accordance with one or more embodiments.

FIG. 9B is an explanatory view of a fifth modified example in accordance with one or more embodiments.

DETAILED DESCRIPTION

Figure 1A:
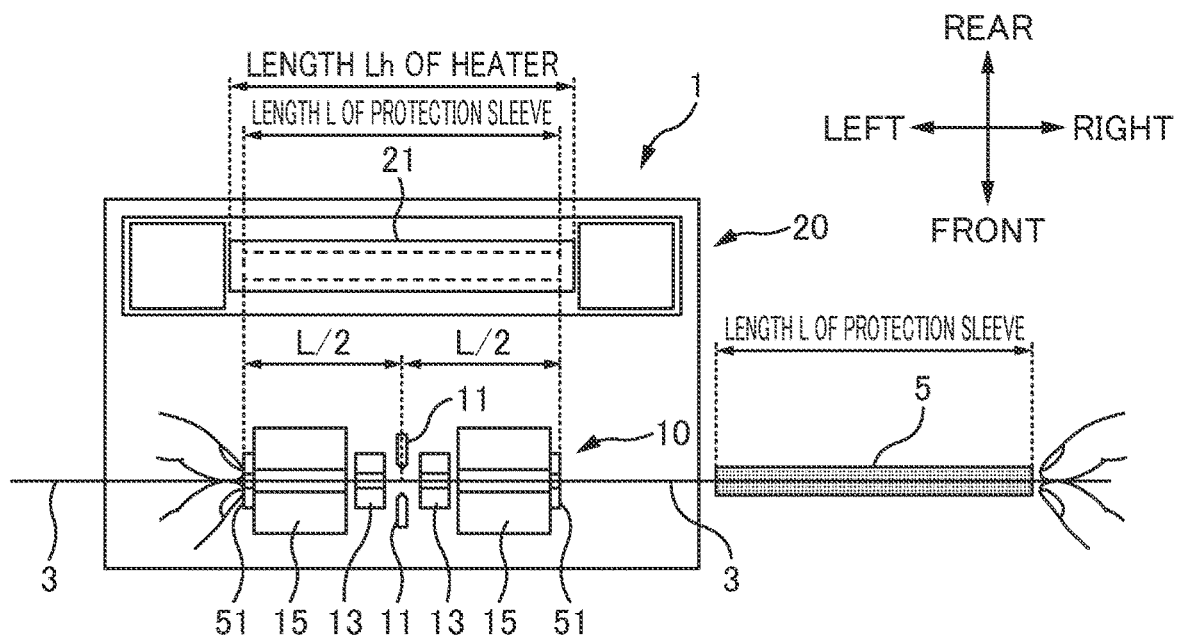
FIG. 1A, FIG. 1B, FIG. 1C, and FIG. 1D are explanatory views of an alignment method of one or more embodiments.

One or more embodiments of the invention will become clear from descriptions in this specification and attached drawings.

A fusion splicing device in accordance with one or more embodiments includes: a connecting section (connector) that fusion splices a pair of optical fibers; a glass clamp part to clamp a glass part that has been removed of a coating of the optical fiber, the glass clamp part being provided to an outer side of the connecting section; a coating clamp part to clamp at least a part of the coating of the optical fiber, the coating clamp part being provided to an outer side of the glass clamp part; a wind protector cover to cover the connecting section, the glass clamp part, and the coating clamp part; a heater to heat a protection sleeve covered on a fusion splice point of the optical fibers that have been fusion spliced with the connecting section; and an aligning part (aligner) that can align fingertips holding the optical fiber, the aligning part being provided inside or to an outer side of the coating clamp part to an upper surface of a device inside the wind protector cover, wherein a distance between the aligning part and the fusion splice point is equal to or less than a half of a length of the heater. According to such a fusion splicing device, an alignment operation of a protection sleeve can be efficiently carried out.

A distance between the aligning part and the fusion splice point may be equal to or less than 34 mm. This is because a longest length of a heater is 68 mm.

A fusion splicing device in accordance with one or more embodiments includes: a connecting section that fusion splices a pair of optical fibers; a glass clamp part to clamp a glass part that has been removed of a coating of the optical fiber, the glass clamp part being provided to an outer side of the connecting section; a coating clamp part to clamp at least a part of the coating of the optical fiber, the coating clamp part being provided to an outer side of the glass clamp part; a wind protector cover to cover the connecting section, the glass clamp part, and the coating clamp part; and an aligning part that can align fingertips holding the optical fiber, the aligning part being provided inside or to an outer side of the coating clamp part to an upper surface of a device inside the wind protector cover, wherein a distance between the aligning part and a fusion splice point is equal to or less than a half of a length of a longest protection sleeve to be covered on the fusion splice point. According to such a fusion splicing device, an alignment operation of a protection sleeve can be efficiently carried out.

A distance between the aligning part and the fusion splice point may be equal to or less than 31 mm. This is because a longest length of a protection sleeve is 62 mm.

A fusion splicing device in accordance with one or more embodiments includes: a connecting section that fusion splices a pair of optical fibers; a glass clamp part to clamp a glass part that has been removed of a coating of the optical fiber, the glass clamp part being provided to an outer side of the connecting section; a coating clamp part to clamp at least a part of the coating of the optical fiber, the coating clamp part being provided to an outer side of the glass clamp part; a wind protector cover to cover the connecting section, the glass clamp part, and the coating clamp part; and an aligning part that can align fingertips holding the optical fiber, the aligning part being provided inside or to an outer side of the coating clamp part to an upper surface of a device inside the wind protector cover, wherein a distance between the aligning part and a fusion splice point is a half of a standard length of a protection sleeve to be covered on the fusion splice point. According to such a fusion splicing device, an alignment operation of a protection sleeve can be efficiently carried out.

The coating clamp part may have a base part to mount the optical fiber, and a press part that is openable and closable in respect to the base part, and the aligning part may be formed to cover at least a part of a side surface to an outer side of the press part. In this way, a press part can be made so as to be easily opened.

The aligning part may have a pair of plate parts extending to an upper side from the base part, and a fiber insertion part that is recessed and formed between the pair of the plate parts. In this way, an optical fiber can be easily held, while aligning the fingertips.

A recessed part may be formed to an outer side of the aligning part. In this way, the operation of holding an optical fiber while aligning the fingertips becomes easy.

A depth of the recessed part may be equal to or greater than 2 mm. In this way, a part of the finger can be easily placed in to a lower side than an optical fiber, and an optical fiber can be easily held.

The coating clamp part may have a base part to mount the optical fiber, and a press part that is openable and closable in respect to the base part, and the aligning part may be formed to an upper surface of the base part that opposes the press part. In this way, the width of the coating clamp part can be set to be wide.

The aligning part may have a curved surface that is recessed, and the curved surface may be formed to a lower side of the optical fiber extending from the coating clamp part. In this way, positions of the fingertips can be easily aligned with the aligning part.

An optical fiber reinforcing method in accordance with one or more embodiments includes: placing a protection sleeve in advance onto a first optical fiber before fusion splicing; clamping at least a part of a coating of the first optical fiber with a first coating clamp part, clamping a glass part that has been removed of a coating of the first optical fiber with a first glass clamp part, and clamping at least a part of a coating of a second optical fiber with a second coating clamp part, and clamping a glass part removed of a coating of the second optical fiber with a second glass clamp part; fusion splicing the first optical fiber and the second optical fiber that are being clamped; after the fusion splicing, removing the first optical fiber and the second optical fiber that have been clamped, while holding the second optical fiber with fingertips aligned to a position in which a distance to a fusion splice point is a half of the protection sleeve, the position being to an upper surface of a device inside a wind protector cover; and covering the protection sleeve onto the fusion splice point by sliding the protection sleeve placed onto the first optical fiber to contact the fingertips holding the second optical fiber. According to such an optical fiber reinforcing method, an aligning operation of a protection sleeve can be carried out efficiently.

<Outline>

Before explaining a basic configuration of a fusion splicing device 1, an alignment method of a protection sleeve 5 will be described first in accordance with one or more embodiments.

FIG. 1A to FIG. 1D are explanatory views of an alignment method in accordance with one or more embodiments. In one or more embodiments, a distance (L/2) between an aligning part 51 and a fusion splice point is set to a half of a length L (standard length) of the protection sleeve 5. It should be noted that, because a length Lh of a heater 21 is longer than a length L of the protection sleeve 5, a distance (L/2) between the aligning part 51 and the fusion splice point is equal to or less than a half of a length Lh of the heater 21 (Note that, a length Lh of the heater 21 is not an entire length of the heating part 20, and is a length of a section that becomes hot for heating the protection sleeve 5 in the heating part 20).

Before setting an optical fiber 3 to the fusion splicing device 1, an operator places in advance the protection sleeve 5 onto one optical fiber 3 of a pair of optical fibers 3 (here, optical fiber 3 to right side in drawing: first optical fiber). Then, the operator performs a pretreatment to the optical fiber 3. In the pretreatment of the optical fiber 3, a coating in an end part of the optical fiber 3 is removed, and the optical fiber 3 is cut such that a glass part that has been removed of the coating becomes a predetermined length and the like.

Next, the operator sets each of the pair of optical fibers 3 that has been pretreated to the fusion splicing device 1. Specifically, at least a part of a coating of the optical fiber 3 on the right side in the drawing (first optical fiber) is clamped with a coating clamp part 15 to the right side (first coating clamp part), and a glass part removed of the coating is clamped with the glass clamp part 13 to the right side (first glass clamp part). Further, at least a part of the coating of the optical fiber 3 to the left side in the drawing (second optical fiber) is clamped with a coating clamp part 15 to the left side (second coating clamp part), and a glass part with the coating removed is clamped with the glass clamp part 13 to the right side (second glass clamp part). Then, the operator operates the fusion splicing device 1, and fusion splices the pair of optical fibers 3 that are clamped. The state shown in FIG. 1A shows a state immediately after the pair of optical fibers 3 have been fusion spliced.

Next, as shown in FIG. 1A, the operator makes the left hand fingers contact the aligning part 51 to align the fingertips, and holds the optical fiber 3 (second optical fiber) with two fingers. At this time, the fingertips that contact the aligning part 51 are aligned in a position in which a distance to the fusion splice point is a half of a length of the protection sleeve 5. Further, at this time, the fingertips, aligned in a position in which a distance to the fusion splice point is a half of a length of the protection sleeve 5, hold the optical fiber 3 (second optical fiber). Then, the operator, while holding the optical fiber 3 with the two fingers of the left hand, removes the optical fibers 3 (first optical fiber and second optical fiber) after fusion splicing that are clamped, and takes out the optical fiber 3 from the fusion splicing part 10.

Figure 1B:
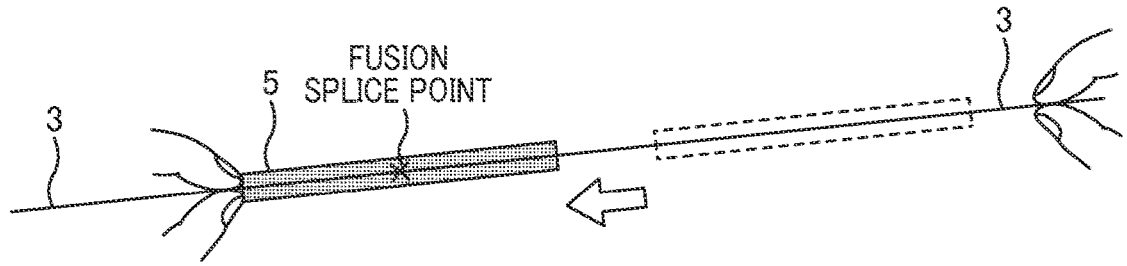

Then, the operator inclines the optical fiber 3 such that the left side is lowered, as shown in FIG. 1B, and makes the protection sleeve 5 placed onto the optical fiber 3 to the right side (first optical fiber) slide to the left side under its own weight. Then, the operator slides the protection sleeve 5 to the left side such that the left end of the protection sleeve 5 contacts the fingertips holding the optical fiber 3. When the protection sleeve 5 slides to the left side, the protection sleeve 5 is covered over the fusion splice point of the optical fibers 3. Then, the left end of the protection sleeve 5 contacts the fingertips holding the optical fiber 3, and when the protection sleeve 5 cannot slide to the left side any more, the fusion splice point is positioned in the center of the protection sleeve 5. In other words, by sliding the protection sleeve 5 until it contacts the fingertips aligned with the aligning part 51 (fingertips holding second optical fiber), the fusion splice point and the center of the protection sleeve 5 are aligned, and the protection sleeve 5 can be covered on the fusion splice point. In this way, the fusion splice point and the center of the protection sleeve 5 can be aligned with an easy method in one or more embodiments, thus the alignment operation of the protection sleeve can be carried out efficiently.

Figure 1C:
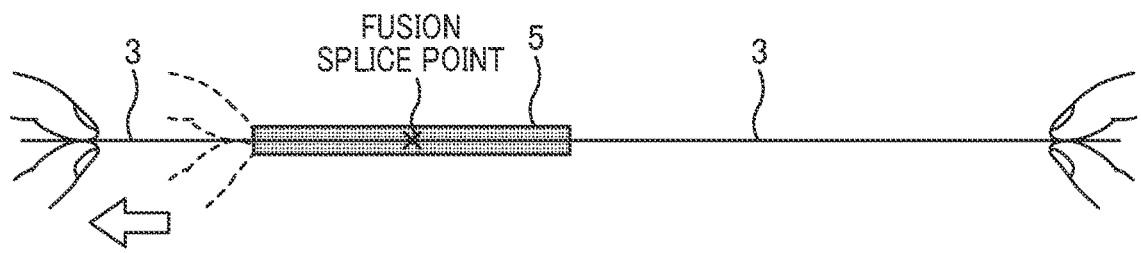

Then, the operator returns the inclined optical fiber 3 to a horizontal state, as shown in FIG. 1C, and slides the fingertips of the left hand contacting the protection sleeve 5 to the left side along the optical fiber 3. In this way, a gap is made between the protection sleeve 5 and the fingertips of the left hand, thus the protection sleeve 5 can be easily set in the heater 21. It should be noted that, at this time, the position of the protection sleeve 5 in respect to the optical fiber 3 does not change, and the fusion splice point is positioned in the center of the protection sleeve 5.

Figure 1D:
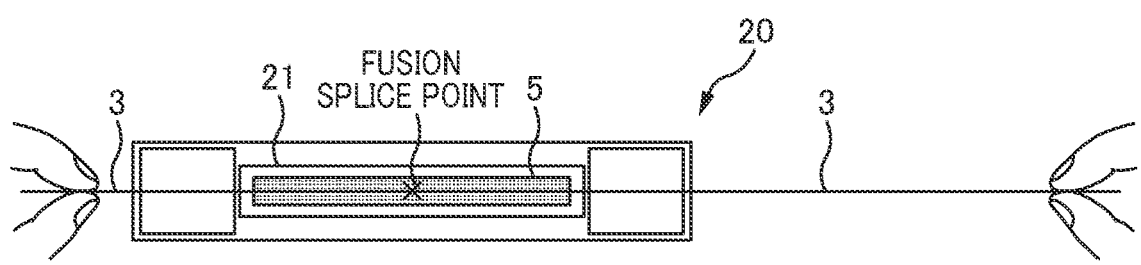

Then, the operator sets the protection sleeve 5 in the heater 21, as shown in FIG. 1D. At this time, the operator sets the protection sleeve 5 in the heater 21, such that a gap between the end part of the protection sleeve 5 and the end part of the heater 21 is equal at both the left and the right. In this way, the center of the protection sleeve 5 and the center of the heater 21 are aligned. It should be noted that, the heater 21 is slightly longer than the protection sleeve 5 (approximately a few mm), so that supposing the center of the protection sleeve 5 is shifted from the center of the heater 21, the gap between the end part of the protection sleeve 5 and the end part of the heater 21 to the left and the right become unequal such that it can be identified by visual inspection. Thus, even when the operator sets the protection sleeve 5 to the heater 21 by visual inspection, the alignment between the center of the protection sleeve 5 and the center of the heater 21 will be carried out almost accurately. A mark showing a setting position of an end part of a protection sleeve 5, however, can be provided to the heater 21, and the end part of the protection sleeve 5 may be aligned to this mark, and the protection sleeve 5 may be set in the heater 21.
<Basic Configuration>

A configuration of a fusion splicing device appropriate for one or more embodiments the above alignment method is explained.

Figure 3:
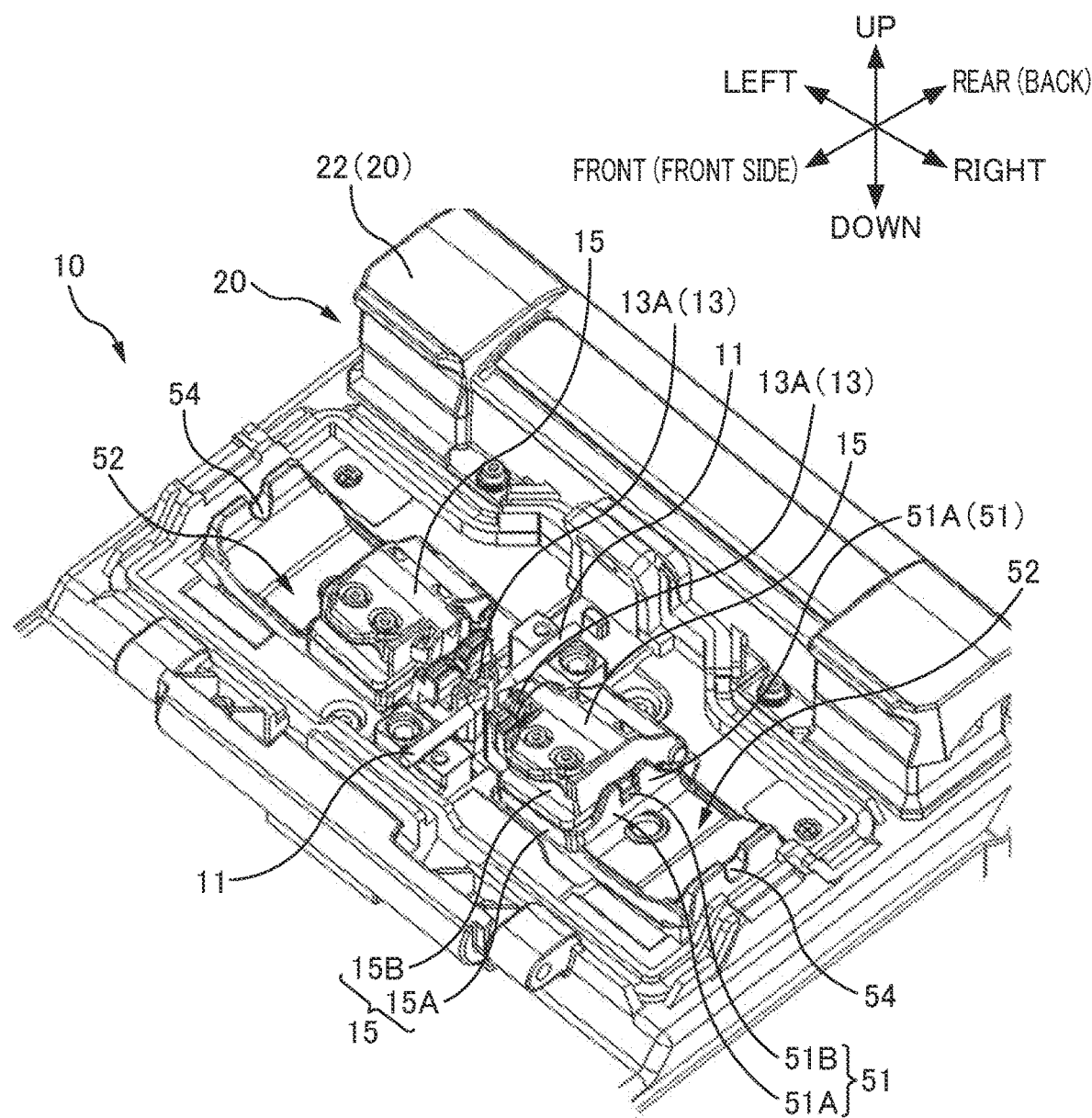
FIG. 3 is a perspective view of a fusion splicing part 10 of an upper surface of a device inside a wind protector cover 17 in accordance with one or more embodiments.
Figure 4:
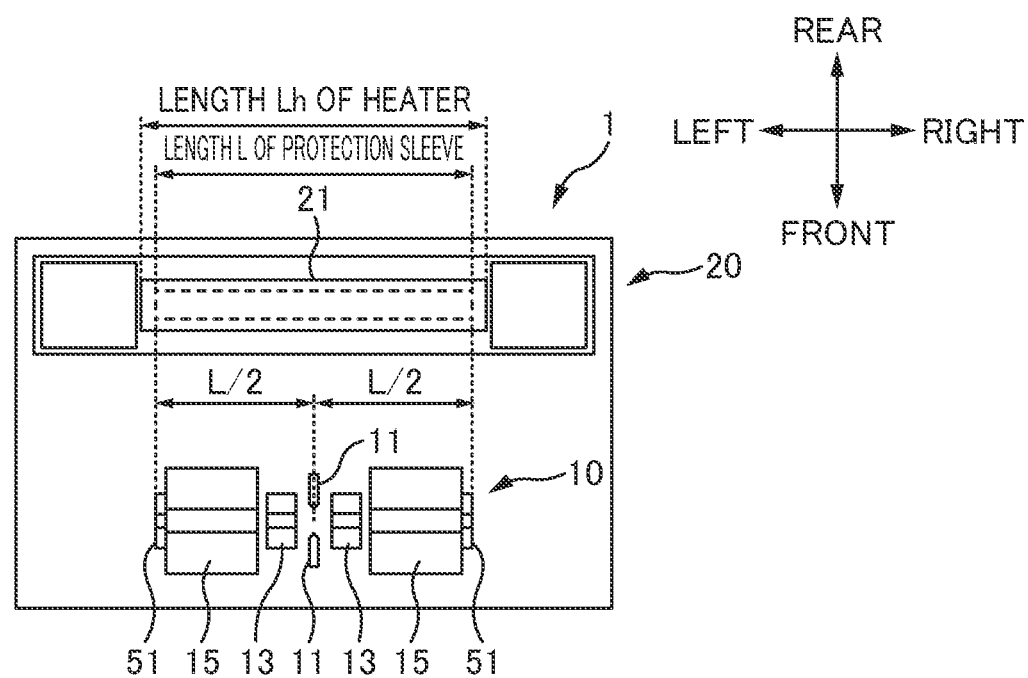
FIG. 4 is a schematic explanatory view of a fusion splicing part 10 and a heating part 20 in accordance with one or more embodiments.

FIG. 2A and FIG. 2B are top views of a fusion splicing device 1 in accordance with one or more embodiments. FIG. 2A is a view showing a lid of the fusion splicing device 1 (wind protector cover 17 and heater cover 22) in a closed state. FIG. 2B is a view showing a lid of the fusion splicing device 1 in an open state. FIG. 3 is a perspective view of a fusion splicing part 10 in an upper surface of the device inside the wind protector cover 17 in accordance with one or more embodiments. FIG. 4 is a schematic explanatory view of the fusion splicing part 10 and a heating part 20 in accordance with one or more embodiments.

In the following explanation, each direction is defined as below. A longitudinal direction of an optical fiber 3 when fusion splicing is referred to as a "left-right direction", a right hand side of an operator when seen from an operator operating the fusion splicing device 1 is referred to as "right", and an opposite side is referred to as "left". A direction in which the pair of electrodes 11 are opposed is referred to as a "front-rear direction", and the operator's side when seen from the electrode 11 is referred to as "front", and an opposite side (heating part 20 side) is referred to as "rear". It should be noted that, the front-rear direction is referred to as a "depth direction", the operator's side is referred to as "front side", and the heating part 20 side is also referred to as "back". A direction perpendicular to the left-right direction and the front-rear direction (or, a direction perpendicular to a mounting surface of the optical fiber 3 in the glass clamp part 13) is referred to as an "up-down direction", an upper side in a vertical direction is referred to as "up", and an opposite side is referred to as "down".

The fusion splicing device 1 is a device that fusion splices a pair of optical fibers 3. The fusion splicing device 1, in one or more embodiments fusion splices a pair of single optical fibers 3, but may fusion splice a pair of optical fibers with multiple fibers (for example, a pair of optical fiber ribbons). The fusion splicing device 1 has a fusion splicing part 10, a heating part 20, an operation section 31, and a display section 32.

The fusion splicing part 10 is a mechanism to fusion splice optical fibers 3. The fusion splicing part 10 has a pair of electrodes 11, a pair of glass clamp parts 13, a pair of coating clamp parts 15, and a wind protector cover 17.

The pair of electrodes 11 is a connecting section to fusion splice a pair of optical fibers 3. In other words, the electrodes 11 are a discharge electrode bar. The pair of electrodes 11 (connecting section) fusion splices the pair of single optical fiber 3 in one or more embodiments, but may fusion splice a pair of optical fibers with multiple fibers (for example, a pair of optical fiber ribbons). The pair of electrodes 11 generates an arc discharge to heat tip end parts of the optical fibers 3, the heated tip end parts of the optical fibers 3 melt, and the pair of optical fibers 3 are fusion spliced. When seen from above, the fusion splice point of the optical fibers 3 is positioned on a line connecting the pair of electrodes 11 (however, in the case where the optical fibers 3 and the electrodes 11 are misaligned in the up-down direction, the fusion splice point of the optical fibers 3 may become misaligned to a central position between the pair of electrodes 11 in the up-down direction). In other words, the position of the fusion splice point of the optical fibers 3 in the left-right direction is approximately the same as the position of the electrodes 11 in the left-right direction. The pair of electrodes 11 is provided to an upper surface of the device inside the wind protector cover 17.

The glass clamp part 13 is a section to clamp a glass part (a section from which a coating of an optical fiber 3 has been removed) of an optical fiber 3. The glass clamp part 13 clamps a single optical fiber 3 in one or more embodiments, but may clamp a plurality of optical fibers (for example, optical fiber ribbon). The pair of glass clamp parts 13 (first glass clamp part and second glass clamp part) are provided to an outer side of the pair of electrodes 11 in the left-right direction. The glass clamp part 13 has a base part 13A with a V groove, and a press part 13B. The base part 13A (V groove) of the glass clamp part 13 is provided to an upper surface of the device inside the wind protector cover 17. The press part 13B is provided to an inner surface of the wind protector cover 17. When the wind protector cover 17 is closed, the glass part of the optical fiber 3 is clamped between the base part 13A (V groove) and the press part 13B.

The coating clamp part 15 is a section to clamp at least a part of a coating of an optical fiber 3. The coating clamp part 15 clamps a single optical fiber 3 in one or more embodiments, but may clamp a plurality of optical fibers (for example, an optical fiber ribbon). A pair of coating clamp parts 15 (first coating clamp part and second coating clamp part) is provided to outer sides of the pair of glass clamp parts 13 in the left-right direction. In other words, one coating clamp part 15 is arranged further to the right side of the glass clamp part 13 in the right side of the drawing, and the other coating clamp part 15 is arranged further to the left side of the glass clamp part 13 to left side in the drawing. The coating clamp part 15 has a base part 15A with a V groove and a press part 15B. The press part 15B of the coating clamp part 15 is provided so as to be openable and closable in respect to the base part 15A, and when the press part 15B is closed, the coating of the optical fiber 3 is to be clamped between the base part 15A (V groove) and the press part 15B. The optical fiber 3 to be clamped with the coating clamp part 15 may be coated in all sections, or may partly be a glass part (a part to be uncovered of the coating may be clamped). The base part 15A and the press part 15B of the coating clamp part 15 are both provided to an upper surface of a device inside the wind protector cover 17.

In one or more embodiments, the coating clamp part 15 is mounted to the upper surface of the device. However, the coating clamp part 15 may be configured as a holder that can be attached or detached from the upper surface of the device. In this case, when setting an optical fiber 3 in a fusion splicing part 10, the operator clamps the optical fiber 3 in the coating clamp part 15 of the holder, and after pretreating the optical fiber 3, the holder clamping the optical fiber 3 is to be set to the upper surface of the device.

The wind protector cover 17 is a member (cover) covering the fusion splicing part 10 (electrode 11, glass clamp part 13, and coating clamp part 15). The wind protector cover 17 is provided openable and closable in respect to the body of the device. When the wind protector cover 17 is closed, the fusion splicing part 10 is sealed. In this way, a stable discharge can be achieved, and fusion splicing of the optical fiber 3 can be normally carried out. An inner surface of the wind protector cover 17 is provided with the press part 13B of the glass clamp part 13.

In one or more embodiments, the aligning part 51 is provided to an upper surface of the device inside the wind protector cover 17. The aligning part 51 is a section at which fingertips holding an optical fiber 3 are aligned to a predetermined position. It should be noted that, as shown in FIG. 1A and FIG. 1B, the fingertips aligned with the aligning part 51 are contacted with the protection sleeve 5 that has been made to slide, to align the fusion splice point and the protection sleeve 5. Thus, the aligning part 51 is a section at which the fingertips contacted with the protection sleeve 5 are aligned in a predetermined position in respect to fusion splice point. In one or more embodiments, the aligning part 51 is provided to a side surface to an outer side of the coating clamp part 15. This aligning part 51 will be described later.

The heating part 20 is a mechanism to heat the protection sleeve 5. The heating part 20 has the heater 21 and the heater cover 22. The heater 21 is a section that becomes very hot to heat the protection sleeve 5. The heater 21 has a mounting plane to mount the protection sleeve 5, and when heating, this mounting plane becomes very hot. The heater 21 has a hottest temperature at the center in the left-right direction, and the temperature gradient is such that the temperature gradually lowers from the center to end part.

Figure 5:
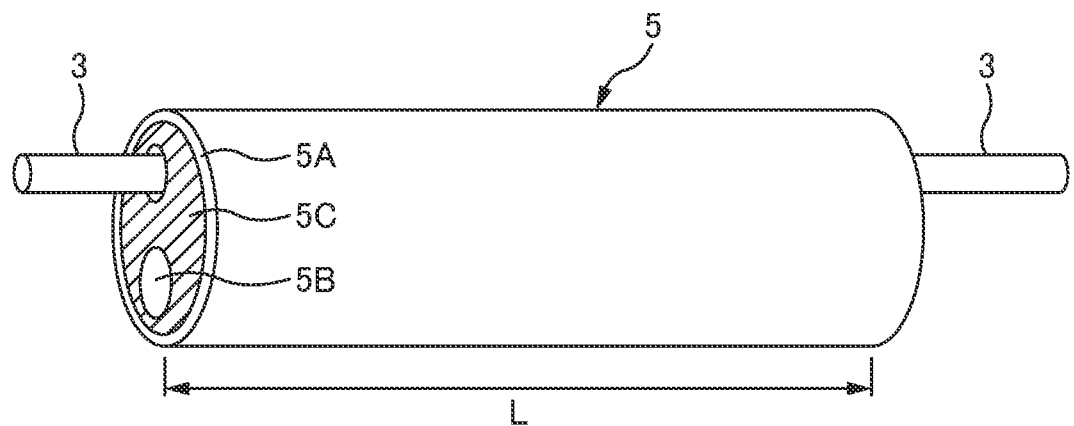
FIG. 5 is a schematic block diagram of a protection sleeve 5 in accordance with one or more embodiments.

FIG. 5 is a schematic block diagram of the protection sleeve 5 in accordance with one or more embodiments.

The protection sleeve 5 is a reinforcing member to protect the fusion splice point and the glass part. The protection sleeve 5 is configured with a heat-shrinkable tube. Specifically, the protection sleeve 5 has an outer tube 5A, a tension member 5B, and a hot-melt adhesive 5C. The outer tube 5A is configured from a heat-shrinkable tube, and is a member that forms the hot-melt adhesive 5C. An inner side of the outer tube 5A houses the tension member 5B and the hot-melt adhesive 5C. The tension member 5B is a member that reinforces against pulling and bending. The tension member 5B, for example, is configured with a metal such as stainless steel, or glass-ceramics. It should be noted that, the length of the tension member 5B does not have to be the same as length L of the protection sleeve 5, and can be shorter than length L. The hot-melt adhesive 5C is a member to protect the fusion splice point and to bond the tension member 5B. The hot-melt adhesive 5C is configured from resin that melts when heating. The hot-melt adhesive 5C may be referred to as an inner tube. The hot-melt adhesive 5C is formed with an insertion hole to insert the optical fiber 3 through. The protection sleeve 5 is heated with the optical fiber 3 inserted through this insertion hole, and in this way the fusion splice point and the glass part of the optical fiber 3 is protected. It should be noted that, the configuration of the protection sleeve 5 is not limited to the above.

The protection sleeve 5 with a length of 60 mm is generally used (a protection sleeve with a length of 40 mm is also available, but 90% of the protection sleeves distributed in the market are protection sleeves with a length of 60 mm). Thus, in one or more embodiments, use of a standard protection sleeve with a length of 60 mm is assumed. An actual length of a standard protection sleeve with a length of 60 mm is in a range of equal to or greater than 60 mm to equal to or less than 62 mm. In one or more embodiments, a "longest length of protection sleeve" refers to "62 mm". Further, in one or more embodiments, "a standard length of a protection sleeve" refers to a range of "equal to or greater than 60 mm to equal to or less than 62 mm".

The heater 21 in one or more embodiments is formed longer than the protection sleeve 5 in the left-right direction. Specifically, a length Lh of the heater 21 in the left-right direction is set in a range of equal to or greater than 64 mm to equal to or less than 68 mm. It should be noted that, when the length Lh of the heater 21 in the left-right direction is equal to or greater than 64 mm, a margin of equal to or greater than 1 mm can be provided to the left and right, and the protection sleeve 5 with a longest length of 62 mm can be set to the heater 21. It should be noted that, when the length Lh of the heater 21 is less than 64 mm, in setting the protection sleeve 5 with a longest length of 62 mm to the heater 21, the margin becomes less than 1 mm to the left and the right, thus setting the protection sleeve 5 to the heater 21 becomes difficult. On the other hand, when the length Lh of the heater 21 is over 68 mm, in a case where the center of the protection sleeve 5 with a length of 60 mm is misaligned with respect to the center of the heater 21, a difference in a gap to the left and right of the end part of the protection sleeve 5 and the end part of the heater 21 cannot be easily visually recognized. Further, when the length Lh of the heater 21 is too long, heat capacity of the heater 21 becomes large, and it takes time for the heater 21 to reach a predetermined temperature. Thus, the length of the heater 21 in the left-right direction may be in a range of equal to or greater than 64 mm to equal to or less than 68 mm.

The operation section 31 is a section where the operator carries out operations of the fusion splicing device 1. Here, the operation section 31 has various buttons. The operation section 31, however, is not limited to buttons, and may be for example, a dial. The display section 32 is a section (display) to display various kinds of information. The operator operates the operation section 31 while looking at the information displayed on the display section 32. It should be noted that, the display section 32 and the operation section 31 can be integrally configured with a touch panel.

<Aligning Part 51>

As shown in FIG. 4, a distance between the aligning part 51 and the fusion splice point is a half of a standard length of the protection sleeve 5 (equal to or greater than 60 mm to equal to or less than 62 mm). In one or more embodiments, the distance between the aligning part 51 and the fusion splice point is equal to or less than a half of a length of the longest protection sleeve 5 (62 mm). Specifically, in one or more embodiments, the distance between the aligning part 51 and the fusion splice point is set to 30 mm. In this way, as shown in FIG. 6B, when the operator makes fingers of a left hand contact the aligning part 51, the fingertips will be aligned in a position in which a distance to the fusion splice point is a half of a length of the protection sleeve 5. In one or more embodiments, because the length of the heater 21 is set in a range of equal to or greater than 64 mm to equal to or less than 68 mm, the distance between the aligning part 51 and the fusion splice point is equal to or less than a half of the length of the heater 21.

Figure 6A:
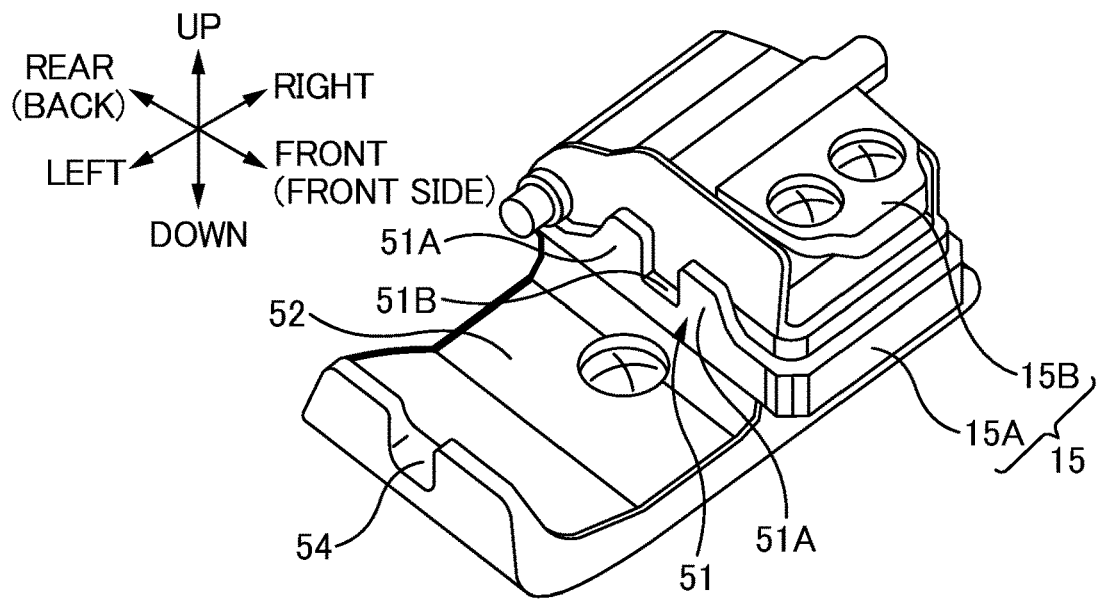
FIG. 6A is a perspective view of a left side coating clamp part 15 and an aligning part 51 in accordance with one or more embodiments.
Figure 6B:
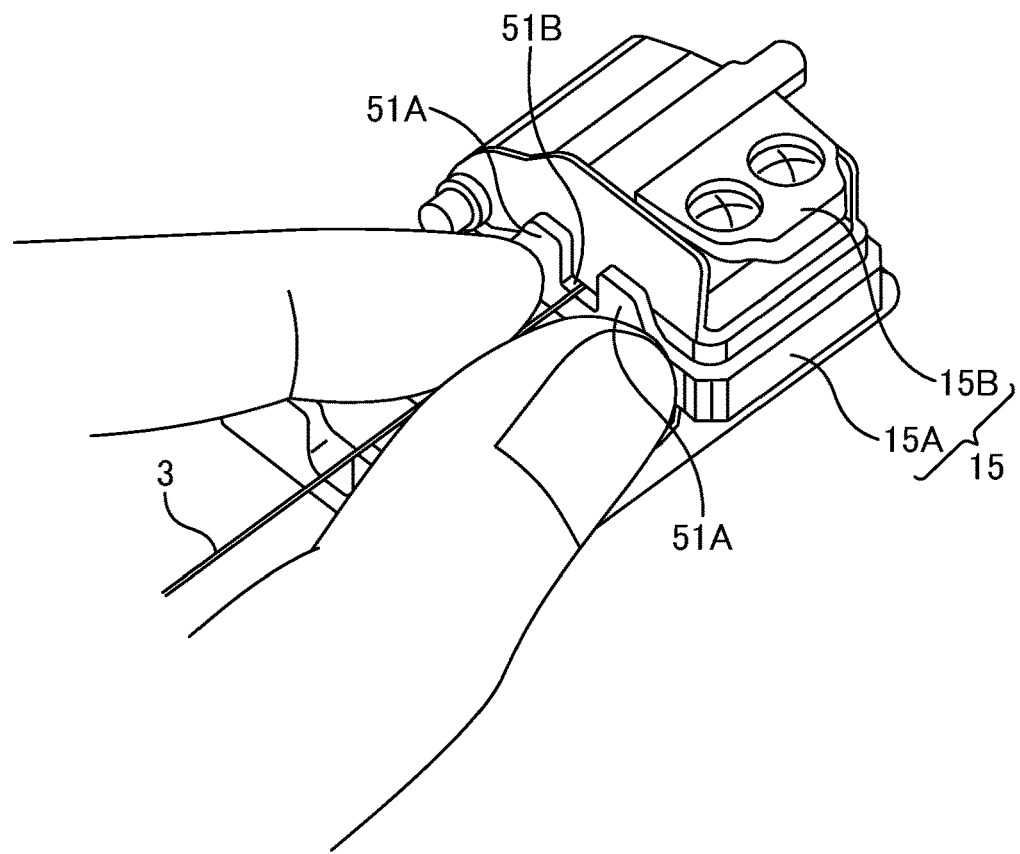
FIG. 6B is an explanatory view of a manner in which an optical fiber 3 is held with two fingers of a left hand in accordance with one or more embodiments.

FIG. 6A is a perspective view of the left side coating clamp part 15 and the aligning part 51 in accordance with one or more embodiments. FIG. 6B is an explanatory view showing holding of an optical fiber 3 with two fingers of a left hand in accordance with one or more embodiments. FIG. 7A is a schematic explanatory view when viewing a periphery of the aligning part 51 from the front in accordance with one or more embodiments. It should be noted that FIG. 7C is a schematic explanatory view of a reference example that does not have an aligning part 51 in accordance with one or more embodiments.

As described already, in one or more embodiments, the aligning part 51 is provided to a side surface to an outer side of the coating clamp part 15 to an upper surface of the device inside the wind protector cover 17. In one or more embodiments, the operator aligns fingertips by making fingers of the left hand contact the aligning part 51, and holding the optical fiber 3 with two fingers.

The aligning part 51 is formed as a plate-form section formed to a side surface to an outer side of the coating clamp part 15. In one or more embodiments, the aligning part 51 has a perpendicular surface (a surface perpendicular to the optical fiber 3 clamped with the coating clamp part 15) in the left-right direction. The fingertips are aligned by making the fingertips contact a plate surface of the plate-form aligning part 51. In other words, the side surface to the outer side of the aligning part 51 becomes a reference position to align the fingertips.

In one or more embodiments, the aligning part 51 is formed to each side surface to an outer side of each of a pair of coating clamp parts 15. In other words, the fusion splicing device 1 in one or more embodiments is provided with a pair of the aligning parts 51. In this way, the operator can not only align fingertips of a left hand using the left side aligning part 51, but can also align fingertips of a right hand using the right side aligning part 51, thus can hold the optical fiber 3 (second optical fiber) with either the left or the right hand and so is convenient. The aligning part 51, however, does not have to be provided to both the left and right, as long as the aligning part 51 is provided to at least either the left or the right.

The aligning part 51 is formed in a plate-form to extend from a base part 15A of the coating clamp part 15 to the upper side (press part 15B side). Thus, this plate-form aligning part 51 is arranged to cover a part of a side surface of the press part 15B from the outer side. In this way, when the fingertips are made to contact the aligning part 51, the fingertips do not easily contact the press part 15B. As a result, when the operator removes the optical fiber 3 from the coating clamp part 15 with the two fingers of the left hand holding the optical fiber 3, the press part 15B can be easily opened.

The plate-form aligning part 51 is formed in a U-shape. In other words, the aligning part 51 has a pair of plate parts 51A extending to the upper side to cover a part of a side surface of the press part 15B from the outer side, and a recessed fiber insertion part 51B formed between the pair of plate parts 51A. The pair of plate parts 51A are arranged aligned in the front-rear direction (depth direction) sandwiching the fiber insertion part 51B. In this way, the fingertip of the thumb is made to contact the plate part 51A to the front side (front), the fingertip of the index finger is made to contact the plate part 51A to the rear side (back side), and the optical fiber 3 inserted in the fiber insertion part 51B can be easily held between the thumb and the index finger.

In one or more embodiments, a recessed part 52 is formed to an outer side of the aligning part 51. The recessed part 52 is a section recessed to a lower side than the optical fiber 3 extending to an outer side from the coating clamp part 15 (or aligning part 51). With the recessed part 52 being formed to an outer side of the aligning part 51, a part of the fingers holding the optical fiber 3 can be placed in to the lower side than the optical fiber 3. In this way, the optical fiber 3 can be held near the section of the fingertips contacting the aligning part 51. In other words, by forming the recessed part 52, the section of the fingertips contacting the aligning part 51 and the section of the fingertips holding the optical fiber 3 can be brought close to each other. In this way, the operation of holding the optical fiber 3 while aligning the fingertips becomes easy.

As described above, the recessed part 52 is a section into which part of the fingers are placed in to the lower side than the optical fiber 3, and the optical fiber 3 can be easily held. Thus, the depth of the recessed part 52 may be equal to or greater than 2 mm. In one or more embodiments, the recessed part 52 is recessed by equal to or greater than 2 mm from an upper surface (a surface formed with a V groove) of the base part 15A of the coating clamp part 15. In other words, when the recessed part 52 is formed, a step part equal to or greater than 2 mm is formed between an upper surface of the base part 15A of the coating clamp part 15 and a bottom surface of the recessed part 52. It should be noted that, when the depth of the recessed part 52 is smaller than 2 mm, part of the fingers cannot be easily placed in to the lower side than the optical fiber 3 (however, when the depth of the recessed part 52 is smaller than 2 mm, compared to a configuration without the recessed part 52, the optical fiber 3 is in a state in which it can be easily held).

The recessed part 52 may be formed along the front-rear direction. In this way, the optical fiber 3 can be easily held with two fingertips in the front-rear direction while a part of the fingers is placed in to the lower side than the optical fiber 3. Specifically, the size of the recessed part 52 in the front-rear direction may be equal to or greater than 15 mm.

In one or more embodiments, a fiber support section 54 is formed to an outer side of the recessed part 52. The fiber support section 54 is a section that supports the optical fiber 3 in an opposite side of the coating clamp part 15 when seen from the recessed part 52 (or aligning part 51). The section of the fiber support section 54 that supports the optical fiber 3 is positioned to an upper side than the bottom surface of the recessed part 52, and here, is approximately the same height as an upper surface of the base part 15A of the coating clamp part 15. Thus, when the optical fiber 3 is supported with the fiber support section 54 and the coating clamp part 15, the optical fiber 3 is in a state floating from the bottom surface of the recessed part 52. In this way, the operator can easily hold the optical fiber 3 with two fingers.

Modified Example

FIG. 7B is an explanatory view of a first modified example in accordance with one or more embodiments. In the first modified example, the aligning part 51 does not cover apart of a side surface of press part 15B from the outer side, but is configured with a side surface of the base part 15A and a side surface of the press part 15B. In the first modified example, when the fingertips contact the aligning part 51, the fingertips contact the press part 15B. As a result, in the first modified example, when the operator removes the optical fiber 3 from the coating clamp part 15 while holding the optical fiber 3 with the two fingers of the left hand, the press part 15B cannot be easily opened. When configuring the aligning part 51 as in the first modified example however, the optical fiber 3 can be held with two fingers, while aligning the fingertips by making fingers of the left hand contact the aligning part 51. In also the first modified example, because the recessed part 52 is formed to an outer side of the aligning part 51, part of the fingers holding the optical fiber 3 can be placed in to the lower side than the optical fiber 3, and the operation of holding the optical fiber 3 while aligning the fingertips becomes easy.

FIG. 8A is an explanatory view of a second modified example in accordance with one or more embodiments. In the second modified example, instead of the aligning part 51 being formed to extend to the upper side from the base part 15A of the coating clamp part 15, the aligning part 51 is formed to extend to the upper side from the bottom surface of the recessed part 52 arranged to an outer side of the coating clamp part 15.

FIG. 8B is an explanatory view of a third modified example in accordance with one or more embodiments. In the third modified example, an aligning part 51 is provided to a guide part 61 independent from a coating clamp part 15. The guide part 61 has the aligning part 51 and a recessed part 52 (and a fiber support section 54).

In the second modified example and the third modified example, an optical fiber 3 can be held with two fingers, while aligning fingertips by making fingers of a left hand contact the aligning part 51. In also the second modified example and third modified example, because the recessed part 52 is formed to an outer side of the aligning part 51, part of the fingers holding the optical fiber 3 can be placed in to the lower side than the optical fiber 3, and the operation of holding the optical fiber 3 while aligning the fingertips becomes easy.

It should be noted that, in one or more embodiments, because there is a restriction to set a distance between the aligning part 51 and a fusion splice point to a half of the length of a protection sleeve 5 (for example, 30 mm), in the second modified example and the third modified example like this, the width of the coating clamp part 15 in the left-right direction needs to be shortened. Even if the width of the coating clamp part 15 in the left-right direction is shortened, however, as long as a force to clamps the optical fiber 3 can be sufficiently ensured, as in the second modified example and the third modified example, the aligning part 51 can be arranged apart from the coating clamp part 15, to an outer side of the coating clamp part 15.

FIG. 9A is an explanatory view of a fourth modified example in accordance with one or more embodiments. In the fourth modified example, the aligning part 51 has a recessed curved surface. The recessed curved surface is formed to a lower side of the optical fiber 3 extending from the coating clamp part 15 (or aligning part 51). The recessed curved surface is configured as a curved surface with a curvature of a degree such that it fits the shape of fingertips.

In the fourth modified example, the operator can fit fingertips to the recessed curved surface, so that the position of the fingertips can be easily fitted to the aligning part 51. It should be noted that, in the fourth modified example, a section closest to the optical fiber 3 of the recessed curved surface (section closest to the coating clamp part 15) becomes the reference position, and in this reference position, the distance between the aligning part 51 and the fusion splice point is set to be a half of the length of the protection sleeve 5 (for example, 30 mm). In this way, the fingertips contacting the aligning part 51 can be aligned in a position such that the distance to the fusion splice point is a half of the length of the protection sleeve 5. In this way, when the protection sleeve 5 is made to slide to contact the fingertips (refer to FIG. 1B), the protection sleeve 5 can be covered on the fusion splice point, while the fusion splice point and the center of the protection sleeve 5 are aligned.

FIG. 9B is an explanatory view of a fifth modified example in accordance with one or more embodiments. In the fifth modified example, similar to the third modified example, an aligning part 51 is provided to a guide part 61 independent from a coating clamp part 15. In the fifth modified example, an aligning part 51 having a recessed curved surface is provided, to the guide part 61. In the fifth modified example, a curved surface is also formed in a bottom surface of the recessed part 52. It should be noted that, in the fifth modified example, a section closest to the optical fiber 3 of the recessed curved surface (a section closest to the coating clamp part 15) becomes a reference position, and in this reference position, a distance between the aligning part 51 and the fusion splice point is set to be a half of the length of the protection sleeve 5 (for example, 30 mm). In this way, fingertips that have contacted the aligning part 51 can be aligned to a position in which a distance to the fusion splice point is a half of the length of the protection sleeve 5.

In also the above fourth modified example and fifth modified example, the optical fiber 3 can be held with two fingers, while aligning fingertips by making fingers of a left hand contact the aligning part 51. In the fourth modified example and the fifth modified example, because the recessed part 52 is formed to the outer side of the aligning part 51, part of fingers holding the optical fiber 3 can be placed in to the lower side than the optical fiber 3, and the operation to hold the optical fiber 3 while aligning the fingertips can be made easy.

Figure 10A:
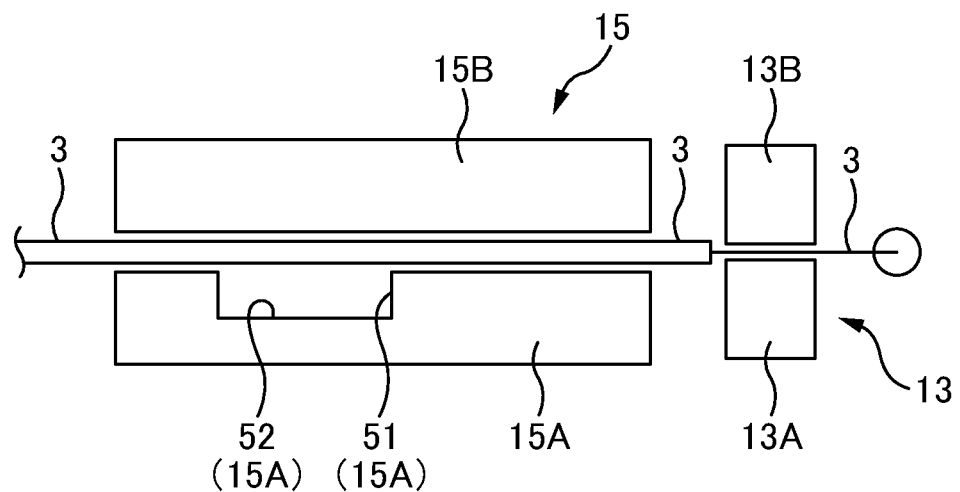
FIG. 10A and FIG. 10B are explanatory views in accordance with one or more embodiments.
Figure 10B:
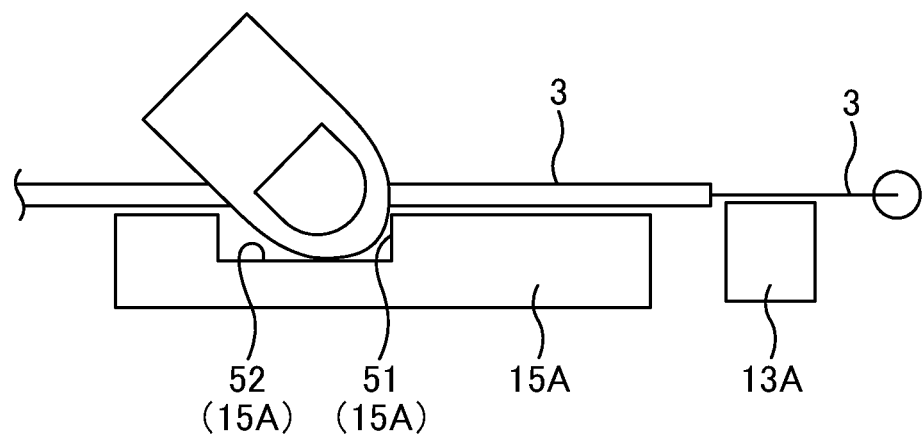

FIG. 10A and FIG. 10B are explanatory views in accordance with one or more embodiments. FIG. 10A is an explanatory view of a coating clamp part 15 and a glass clamp part 13 clamping an optical fiber 3. FIG. 10B is an explanatory view of fingertips holding the optical fiber 3 (when removing the clamped optical fiber 3).

In one or more embodiments, the aligning part 51 is provided to an inner side of the coating clamp part 15 to an upper surface of the device inside a wind protector cover 17. In other words, in one or more embodiments, the aligning part 51 is provided on an upper surface of the base part 15A that opposes the press part 15B of the coating clamp part 15. In this way, the aligning part 51 is not limited to that provided to an outer side of the coating clamp part 15 as in one or more embodiments, and may be provided to an inner side (upper surface of base part 15A) of the coating clamp part 15. As in one or more embodiments, when the aligning part 51 is provided to an inner side of the coating clamp part 15, the recessed part 52 to an outer side of the aligning part 51 may also be provided to an inner side of the coating clamp part 15 (upper surface of base part 15A).

It should be noted that, in one or more embodiments, after fusion splicing the pair of optical fibers 3 that has been clamped, the operator removes the optical fiber 3 in a following procedure.

After fusion splicing, the operator first opens the wind protector cover 17. In this way, a press part 13B of a glass clamp part 13 provided to the wind protector cover 17 is removed, to show the glass part of the optical fiber 3.

Then, the operator opens the press part 15B of the coating clamp part 15 to the left side, while the optical fiber 3 (first optical fiber) is clamped in the right side coating clamp (not shown) without opening the right side coating clamp part 15 (not shown). Then, the operator contacts finger of the left hand to the aligning part 51, as shown in FIG. 10B, to align fingertips, and hold the optical fiber 3 (second optical fiber) with two fingers. At this time, the fingertips contacting the aligning part 51 have been aligned in a position such that a distance to the fusion splice point is a half of the length of the protection sleeve 5. At this time, the optical fiber 3 (second optical fiber) is held with fingertips aligned to a position in which the distance to the fusion splice point is a half of the length of the protection sleeve 5.

Then, the operator opens the press part 15B of a right side coating clamp part 15 (not shown), with the optical fiber 3 being held with the two fingers of the left hand. In this way, the clamped fusion spliced optical fiber 3 (first optical fiber and second optical fiber) is removed, so that the optical fiber 3 can be taken out from the fusion splicing part 10. It should be noted that, the operation after taking out the optical fiber 3 is similar to that of the above-described embodiments (refer to FIG. 1B to FIG. 1D).

By the way, there is a restriction to set the distance between the aligning part 51 and the fusion splice point to be a half of the length of the protection sleeve 5 (for example, 30 mm). Thus, when the aligning part 51 is provided to an outer side of the coating clamp part 15 as in the above-described embodiments, the width of the coating clamp part 15 has to be made relatively short in the left-right direction. On the contrary, in one or more embodiments, by providing the aligning part 51 to an inner side of the coating clamp part 15, there is an advantage that the width of the coating clamp part 15 in the left-right direction can be set to be wide. As a result, in one or more embodiments, the coating clamp part 15 can be easily designed such that a force to clamp the optical fiber 3 can be sufficiently ensured.

As described already, the coating clamp part 15 may be configured as a holder that is attachable and detachable to/from an upper surface of a device. In this case, the aligning part 51 and the recessed part 52 are to be formed to an inner side (upper surface of base part 15A) of the coating clamp part 15 that is a holder.

Figure 11:
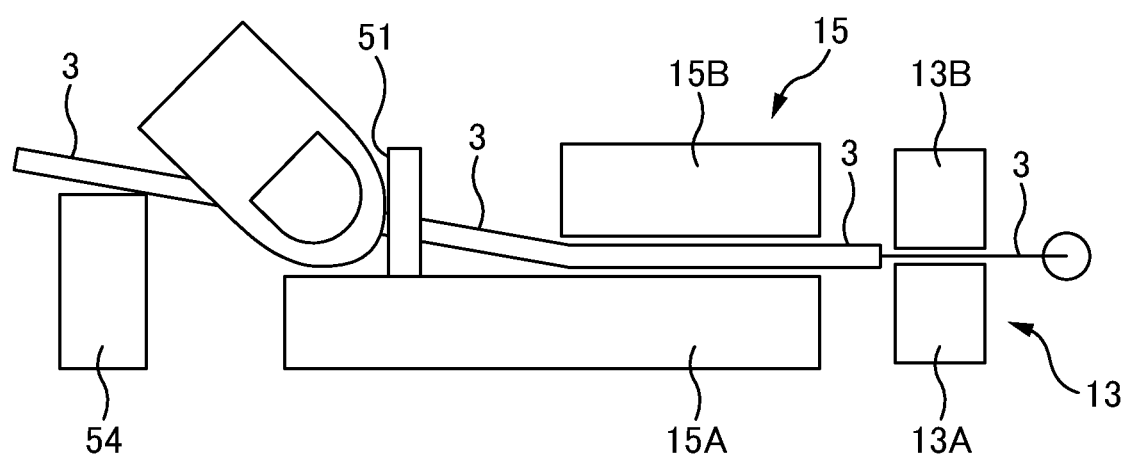
FIG. 11 is an explanatory view in accordance with one or more embodiments.
Figure 12A:
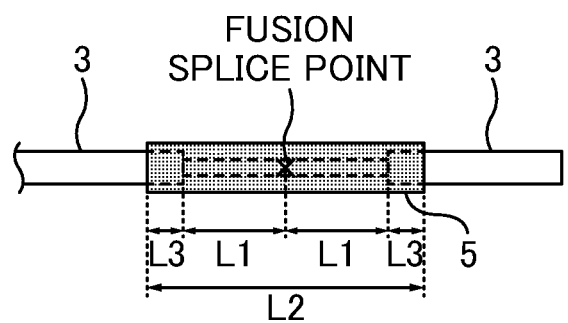
FIG. 12A is an explanatory view of a positional relation between a fusion splice point and a protection sleeve 5 in accordance with one or more embodiments.
Figure 12B:
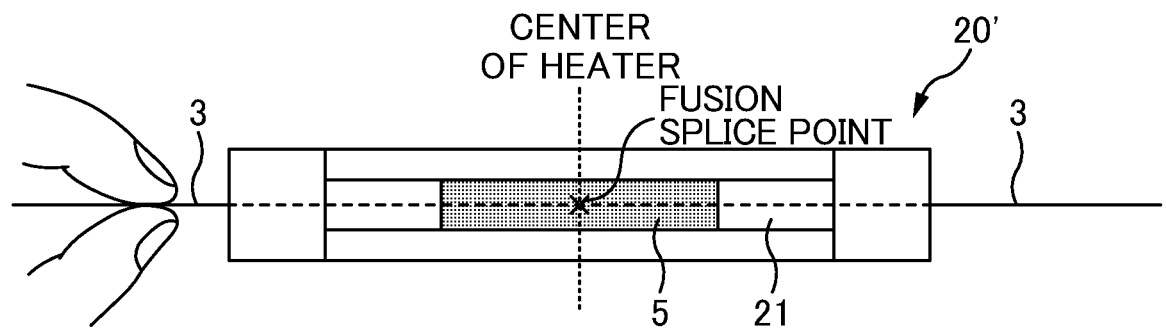
FIG. 12B is an explanatory view of a positional relation of a center of the protection sleeve 5 and a center of a heater 21 in accordance with one or more embodiments.
Figure 13A:
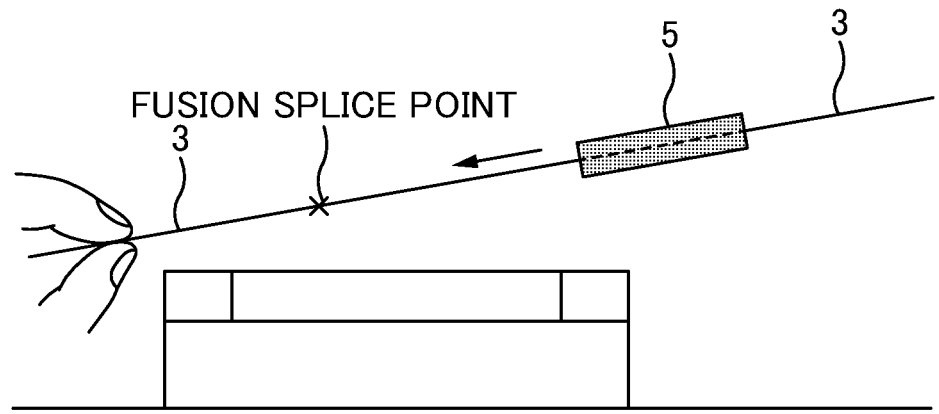
FIG. 13A, FIG. 13B, and FIG. 13C are explanatory views of an alignment method.
Figure 13B:
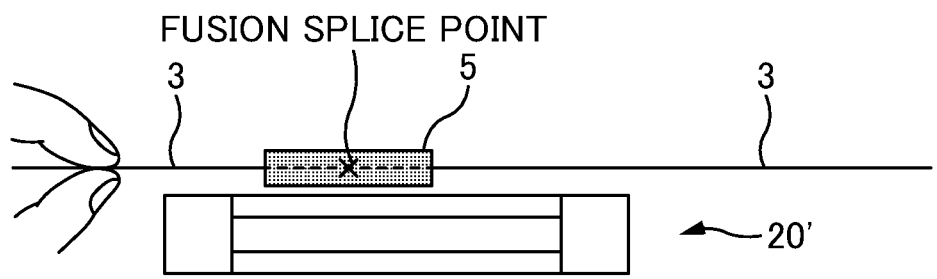
Figure 13C:
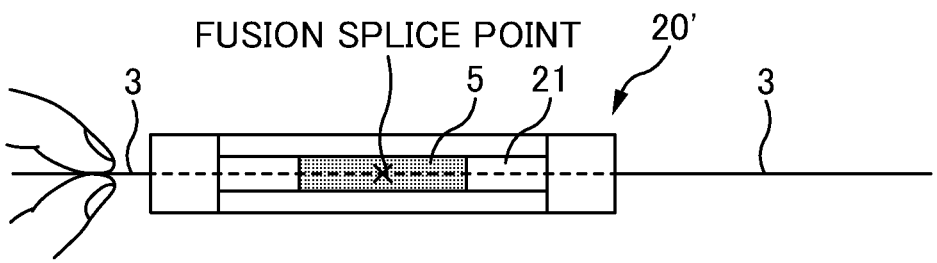
Figure 14:
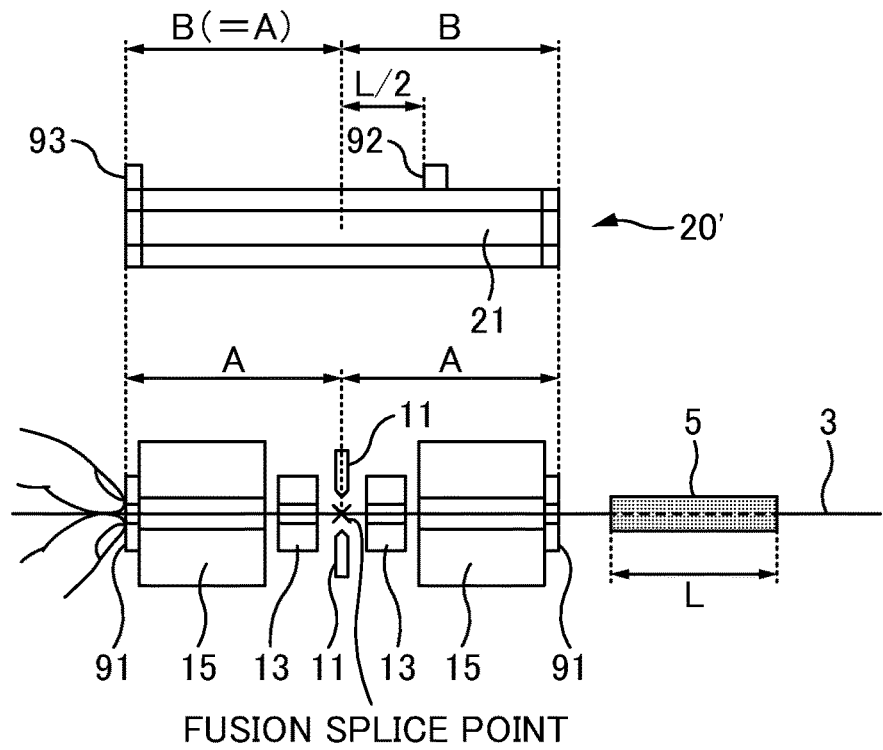
FIG. 14 is an explanatory view of a fusion splicing device.
Figure 15A:
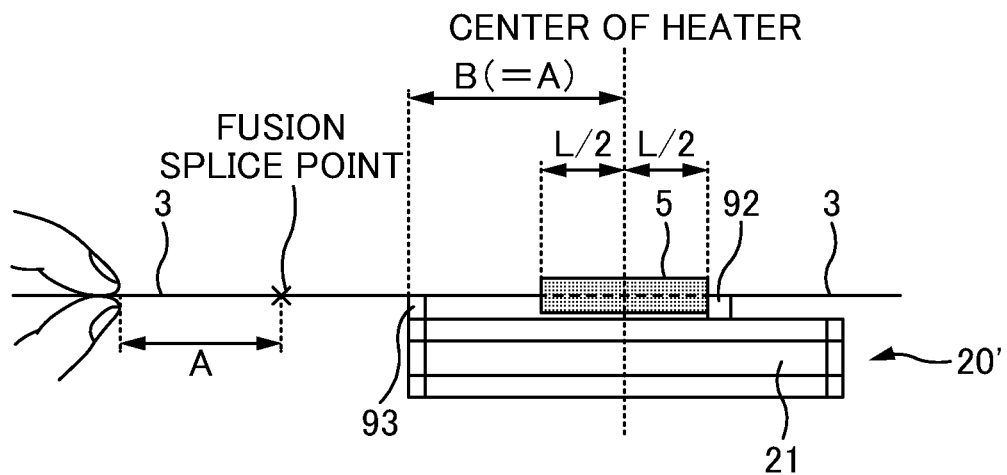
FIG. 15A, FIG. 15B, and FIG. 15C are explanatory views of an alignment method using a fusion splicer in FIG. 14.
Figure 15B:
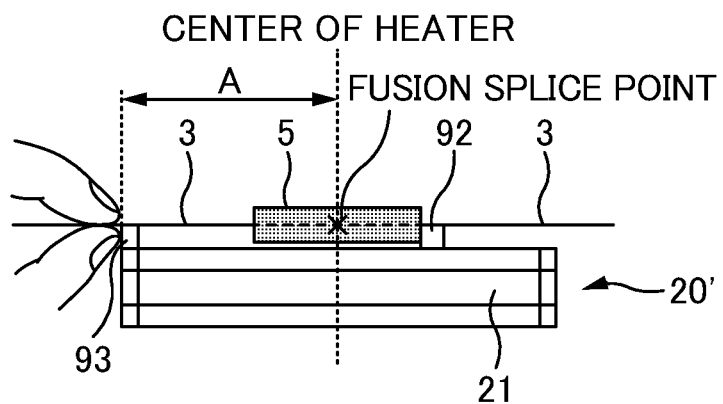
Figure 15C:
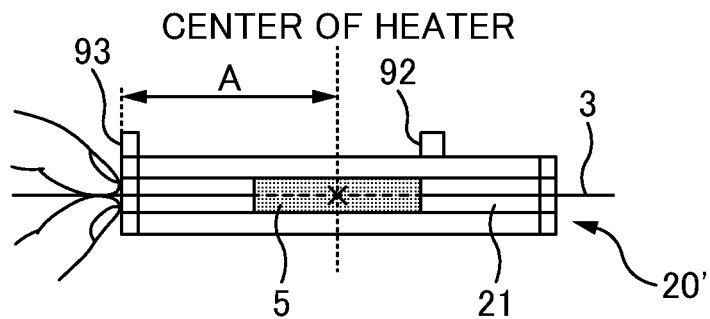

FIG. 11 is an explanatory view in accordance with one or more embodiments.

In one or more embodiments, a recessed part 52 is not formed to an outer side of an aligning part 51, which is different from one or more embodiments. In one or more embodiments, however, an aligning part 51 is provided to an outer side of a coating clamp part 15 to an upper surface of a device inside a wind protector cover 17. Thus, in one or more embodiments, an optical fiber 3 can be held with two fingers while aligning fingertips by making fingers of a left hand contact the aligning part 51.

In one or more embodiments, a section in which a fiber support section 54 supports the optical fiber 3 is in a higher position than an upper surface of a base part 15A of the coating clamp part 15. Thus, when the optical fiber 3 is supported with the fiber support section 54 and the coating clamp part 15, in the position of the aligning part 51, the optical fiber 3 is in a state floating from the bottom surface, and a space can be formed to a lower side of the optical fiber 3. In this way, the operator can easily hold the optical fiber 3 with two fingers.

It should be noted that, in one or more embodiments, the height of the fiber support section 54 can be made to vary in the up-down direction. In this way, easiness to hold the optical fiber 3 with two fingers can be adjusted.

A fusion splicing device 1 in one or more embodiments described above has an electrode 11 (connecting section) that fusion splices a pair of optical fibers 3, a glass clamp part 13 provided to an outer side of the electrode 11, a coating clamp part provided to an outer side of the glass clamp part 13, a wind protector cover 17, a heater 21 that heats a protection sleeve, and an aligning part 51 that can align fingertips holding an optical fiber 3. It should be noted that, the aligning part 51 is provided to an upper surface of a device inside the wind protector cover 17 in one or more embodiments, and in one or more embodiments is provided to an outer side of the coating clamp part 15, and in one or more embodiments the aligning part 51 is provided to an inner side of the coating clamp part 15. Then, in one or more embodiments, the distance between the aligning part 51 and the fusion splice point is equal to or less than a half of a length Lh of the heater 21. Because the length Lh of the heater 21 is longer than length L of the protection sleeve 5, when the distance between the aligning part 51 and the fusion splice point is made equal to or less than a half of the length Lh of the heater 21, when aligning as shown in FIG. 1A to FIG. 1D, the fusion splice point and the center of the protection sleeve can be aligned to the center of the heater 21, and the alignment operation (refer to FIG. 1A to FIG. 1D) of the protection sleeve can be carried out efficiently.

It should be noted that, supposing that, the distance between the aligning part 51 and the fusion splice point is greater than a half of the length of the heater 21, when aligning of the protection sleeve 5 is carried out as in FIG. 1B the positional relation of the fusion splice point and the center of the protection sleeve 5 becomes misaligned, and when the protection sleeve 5 is set in the heater 21 as in FIG. 1D the positional relation between the center of the protection sleeve 5 and the center of the heater 21 becomes misaligned. Thus, the distance between the aligning part 51 and the fusion splice point may be equal to or less than a half of the length Lh of the heater 21. Specifically, because the longest length Lh of the heater 21 is 68 mm, the distance between the aligning part 51 and the fusion splice point may be equal to or less than 34 mm.

In the above-described one or more embodiments, the distance between the aligning part 51 and the fusion splice point is equal to or less than a half of the length of the longest protection sleeve covered on the fusion splice. Specifically, as the longest protection sleeve length is 62 mm, the distance between the aligning part 51 and the fusion splice point may be equal to or less than 31 mm. In this way, when aligning of the protection sleeve 5 as shown in FIG. 1A and FIG. 1B is carried out, the fusion splice point and the center of the protection sleeve 5 can be aligned, and alignment operation of the protection sleeve can be efficiently carried out. It should be noted that, misalignment of the positional relation of the fusion splice point and the center of the protection sleeve 5 is allowable in a range of an error (2 mm) between the standard length (equal to or greater than 60 mm and equal to or less than 62 mm) of the protection sleeve 5 and the longest length of the protection sleeve 5 (62 mm), thus a lower limit of the distance between the aligning part 51 and the fusion splice point may be a value (58 mm) obtained by subtracting an error (2 mm) from the standard length (60 mm). Namely, the distance between the aligning part 51 and the fusion splice point may be equal to or greater than 58 mm (equal to or greater than a value obtained by subtracting an error of 2 mm from a standard length of 60 mm), and is equal to or less than 62 mm (equal to or less than a length of a longest protection sleeve 5).

In the above-described one or more embodiments, the distance between the aligning part 51 and the fusion splice point may be a half of a standard length of a protection sleeve to be covered onto the fusion splice point (equal to or greater than 60 mm and equal to or less than 62 mm). Specifically, the distance between the aligning part 51 and the fusion splice point may be in a range of equal to or greater than 30 mm to equal to or less than 31 mm. In this way, when aligning of the protection sleeve 5 is performed as shown in FIG. 1A and FIG. 1B, the fusion splice point and the center of the protection sleeve 5 can be aligned, and alignment operation of the protection sleeve can be efficiently carried out.

In one or more embodiments shown in FIG. 6A and FIG. 7A, the aligning part is formed to cover a part of the side surface of the press part 15B of the coating clamp part 15. In this way, when the fingertips are contacted to the aligning part 51, the fingertips do not easily contact the press part 15B, thus the press part 15B can be easily opened when removing the optical fiber 3 from the coating clamp part 15 with the optical fiber 3 in the held state.

In one or more embodiments shown in FIG. 6A and FIG. 7A, the aligning part 51 has the pair of plate parts 51A extending to the upper side from the base part 15A, and a fiber insertion part 51B that is recessed formed between the pair of plate parts 51A. In this way, a fingertip of a thumb is contacted to one plate part 51A, and a fingertip of an index finger is contacted to another plate part 51A, such that the optical fiber 3 inserted through the fiber insertion part 51B can be easily held between the thumb and the index finger.

In the above-described one or more embodiments, the recessed part 52 is formed to an outer side of the aligning part 51. In this way, the operation to hold the optical fiber 3 while aligning the fingertips becomes easy. The depth of the recessed part 52 described above is equal to or greater than 2 mm. In this way, a part of the finger can be easily placed in to the lower side than the optical fiber 3, and the optical fiber 3 can be easily held.

In one or more embodiments shown in FIG. 10A and FIG. 10B, the aligning part 51 is provided to the upper surface of the base part 15A that opposes the press part 15B of the coating clamp part 15. Because there is a restriction to set a distance between the aligning part 51 and the fusion splice point to a half of a length of the protection sleeve 5, by providing the aligning part 51 to an inner side of the coating clamp part 15, the width of the coating clamp part 15 in the left-right direction can be set to be wide.

In the above-described fourth modified example and fifth modified example (refer to FIG. 9A and FIG. 9B), the aligning part 51 has a curved surface that is recessed, and the recessed curved surface is formed to the lower side of the optical fiber 3 extending from the coating clamp part 15. In this way, because fingertips can be fitted to the recessed curved surface, the position of the fingertips can be easily aligned with the aligning part 51.

With the optical fiber 3 reinforcing method in the above-described embodiments, before setting the optical fiber 3 in the fusion splicing device 1, the operator places the protection sleeve 5 in advance onto one of the optical fibers 3 (first optical fiber) of the pair of optical fibers 3. Then, the operator sets each one of the pair of optical fibers 3 to the fusion splicing device 1. Specifically, at least a part of the coating of one of the optical fiber 3 (first optical fiber) onto which the protection sleeve 5 has been placed is clamped with the coating clamp part 15 (first coating clamp part), and a glass part removed of the coating is clamped with one of the glass clamp part 13 (first glass clamp part), and at least apart of the coating of another optical fiber 3 (second optical fiber) is clamped with the other coating clamp part 15 (second coating clamp part), and a glass part removed of the coating is clamped with the other glass clamp part 13 (second glass clamp part). Then, the operator fusion splices the clamped pair of optical fibers 3. Then, as shown in FIG. 1A, after fusion splicing, the operator removes the clamped optical fibers 3 (first optical fiber and second optical fiber), with fingertips aligned to a position in which a distance to a fusion splice point is a half of a length of the protection sleeve 5 holding the other optical fiber 3 (second optical fiber). Then, as shown in FIG. 1B, the operator slides the protection sleeve placed onto one of the optical fibers 3 (first optical fiber) to contact the fingertips holding the other optical fiber 3 (second optical fiber), to cover the protection sleeve on the fusion splice point. With such an optical fiber 3 reinforcing method, the alignment operation of the protection sleeve (operation of aligning the fusion splice point and center of the protection sleeve 5) can be efficiently carried out.

===Other Points===

The above-described embodiments are to facilitate understanding of the present invention, and do not limit the present invention in any way. This invention can be changed or modified without departing from the gist thereof, and it is needless to say that this invention includes its equivalents Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 fusion splicing device,
3 optical fiber, 5 protection sleeve,
5A outer tube, 5B tension member, 5C hot-melt adhesive,
10 fusion splicing part, 11 electrode (connecting section),
13 glass clamp part, 13A base part, 13B press part,
15 coating clamp part, 15A base part, 15B press part,
17 wind protector cover, 20 heating part,
21 heater, 22 heater cover,
31 operation section, 32 display section,
51 aligning part, 51A plate part, 51B fiber insertion part,
52 recessed part, 54 fiber support section, 61 guide part,
91 guide, 92 guide part, 93 guide.

The invention claimed is:
1. A fusion splicing device comprising:
a connector that fusion splices a first optical fiber and a second optical fiber;

a first glass clamp that clamps a glass part that has been exposed by removing a coating from the first optical fiber, wherein the first glass clamp is provided at an outer side of the connector;
a first coating clamp that clamps at least a part of the coating of the first optical fiber, wherein the first coating clamp is provided at an outer side of the first glass clamp;
a second glass clamp that clamps a glass part that has been exposed by removing a coating from the second optical fiber, wherein the second glass clamp is provided at an outer side of the connector;
a second coating clamp that clamps at least a part of the coating of the second optical fiber, wherein the second coating clamp is provided to an outer side of the second glass clamp;
a wind protector cover that covers the connector, the first glass clamp, the second glass clamp, the first coating clamp, and the second coating clamp;
a heater that has a length of 64 to 68 mm and that heats a protection sleeve placed on a fusion splice point of the first optical fiber and the second optical fiber that have been fusion spliced with the connector, wherein the protection sleeve has a length of 60 to 62 mm; and
an aligner that aligns fingertips holding the second optical fiber, wherein the aligner is provided at an inner side or at an outer side of the coating clamp and to an upper surface of the fusion splicing device inside the wind protector cover, wherein
a distance between the aligner and the fusion splice point is 29 to 31 mm and less than half the length of the heater.

2. The fusion splicing device according to claim 1, wherein
a distance between the aligner and the fusion splice point is 30 to 31 mm.

3. The fusion splicing device according to claim 1, wherein
the first and second coating clamps each have a base to mount one of the first and second optical fibers, and a press that is openable and closable with respect to the base, and
the aligner covers at least a part of a side surface to an outer side of the press.

4. The fusion splicing device according to claim 3, wherein
the aligner comprises a pair of plates extending to an upper side from the base, and a fiber insertion that is recessed and formed between the pair of the plates.

5. The fusion splicing device according to claim 1, wherein
a recession is formed to an outer side of the aligner.

6. The fusion splicing device according to claim 5, wherein
a depth of the recession is equal to or greater than 2 mm.

7. The fusion splicing device according to claim 1, wherein
each of the first coating clamp and the second coating clamp comprises a base to mount each of the first optical fiber and the second optical fiber, and a press that is openable and closable with respect to the base, and
the aligner is formed in an upper surface of the base that opposes the press.

8. The fusion splicing device according to claim 1, wherein
the aligner has a curved surface that is recessed, and
the curved surface is formed on a lower side of the optical fiber extending from the second coating clamp.

9. An optical fiber reinforcing method comprising:
placing a protection sleeve in advance onto a first optical fiber before fusion splicing wherein the protection sleeve has a length of 60 to 62 mm;
clamping at least a part of a coating of the first optical fiber with a first coating clamp;
clamping a glass part that has been exposed by removing the coating from the first optical fiber with a first glass clamp;
clamping at least a part of a coating of a second optical fiber with a second coating clamp;
clamping a glass part that has been exposed by removing the coating from the second optical fiber with a second glass clamp;
fusion splicing the first optical fiber and the second optical fiber that are being clamped;
after the fusion splicing, removing the first optical fiber and the second optical fiber that have been clamped, while holding the second optical fiber with fingertips aligned to a position in which a distance to a fusion splice point is half a length of the protection sleeve, wherein the position is on an upper surface of a fusion splicing device inside a wind protector cover;
placing the protection sleeve onto the fusion splice point by sliding the protection sleeve placed onto the first optical fiber to contact the fingertips holding the second optical fiber;
heating the protection sleeve by setting the protection sleeve in a heater for fusion splicing the first optical fiber and the second optical fiber such that a first distance between a first end of the protection sleeve and a corresponding first end of the heater is equal to a second distance between a second end of the protection sleeve and a corresponding second end of the heater, wherein the heater has a length of 64 to 68 mm;
placing an aligner at a distance of 29 to 31 mm from the fusion splice point and of less than half of the length of the heater, wherein the aligner is disposed to an inner side or to an outer side of the first coating clamp and to an upper surface of the fusion splicing device inside the wind protector cover; and
after the fusion splicing, holding the second optical fiber with the fingertips in a state where the fingertips are aligned with the aligner.

* * * * *